(12) United States Patent
Ketsuka et al.

(10) Patent No.: US 11,153,448 B2
(45) Date of Patent: Oct. 19, 2021

(54) INFORMATION PROCESSING APPARATUS AND NON-TRANSITORY COMPUTER READABLE MEDIUM FOR DISPLAYING INFORMATION INDICATING DIFFERENCE IN SETTING VALUE OF APPLICATIONS

(71) Applicant: FUJIFILM BUSINESS INNOVATION CORP., Tokyo (JP)

(72) Inventors: Masakazu Ketsuka, Kanagawa (JP); Naoki Mukai, Kanagawa (JP); Kohei Kaibara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 166 days.

(21) Appl. No.: 15/971,198

(22) Filed: May 4, 2018

(65) Prior Publication Data

US 2018/0338051 A1 Nov. 22, 2018

(30) Foreign Application Priority Data

May 19, 2017 (JP) .............................. JP2017-100135

(51) Int. Cl.
*H04N 1/00* (2006.01)
(52) U.S. Cl.
CPC ..... *H04N 1/00424* (2013.01); *H04N 1/00411* (2013.01); *H04N 1/00437* (2013.01); *H04N 1/00503* (2013.01)
(58) Field of Classification Search
None
See application file for complete search history.

(56) References Cited

U.S. PATENT DOCUMENTS

| 7,757,180 B2* | 7/2010 | Nakai | G06F 3/0486 715/769 |
| 9,781,281 B2 | 10/2017 | Ebitani | |
| 2010/0017731 A1* | 1/2010 | Taira | G06F 3/038 715/765 |
| 2013/0074008 A1* | 3/2013 | Umezawa | H04N 1/00413 715/810 |
| 2018/0234564 A1* | 8/2018 | Hirasawa | H04N 1/00474 |

FOREIGN PATENT DOCUMENTS

| JP | 2013-008224 A | 1/2013 |
| JP | 2013008224 | * 8/2013 |
| JP | 2015-115841 A | 6/2015 |
| JP | 2015-174298 A | 10/2015 |
| JP | 2016-045762 A | 4/2016 |
| JP | 2017-085268 A | 5/2017 |

OTHER PUBLICATIONS

Feb. 2, 2021 Office Action issued in Japanese Patent Application No. 2017-100135.

* cited by examiner

*Primary Examiner* — Barbara D Reinier
(74) *Attorney, Agent, or Firm* — Oliff PLC

(57) ABSTRACT

An information processing apparatus includes a display that displays a first operator corresponding to a standard application and a second operator corresponding to a one-touch application of a same type that is obtained by changing a setting value of a function of the standard application and that starts if the second operator is touched and a controller that displays, in association with the second operator, information indicating a difference in the setting value.

17 Claims, 19 Drawing Sheets

FIG. 8A
FIG. 8B
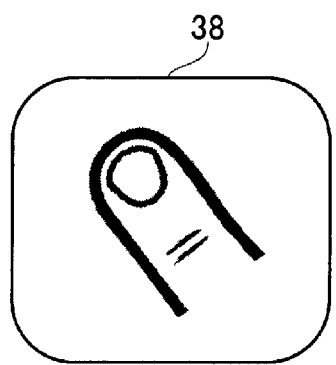
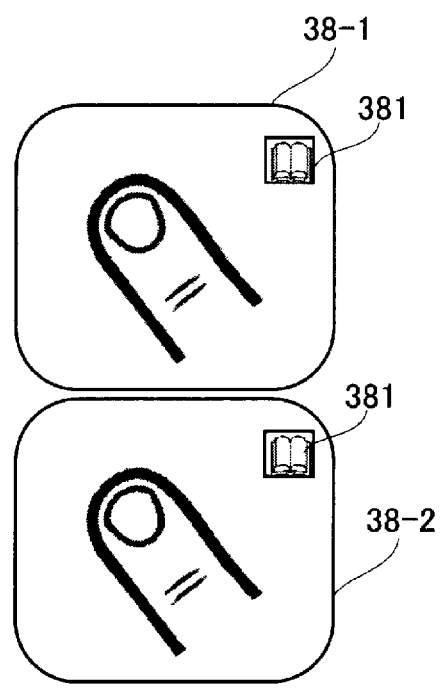

FIG. 11A
FIG. 11B
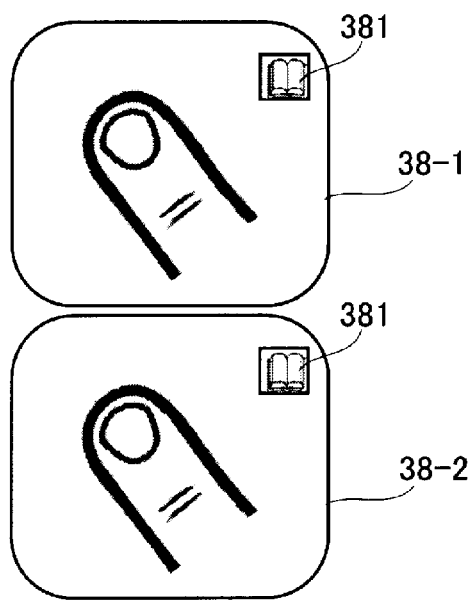
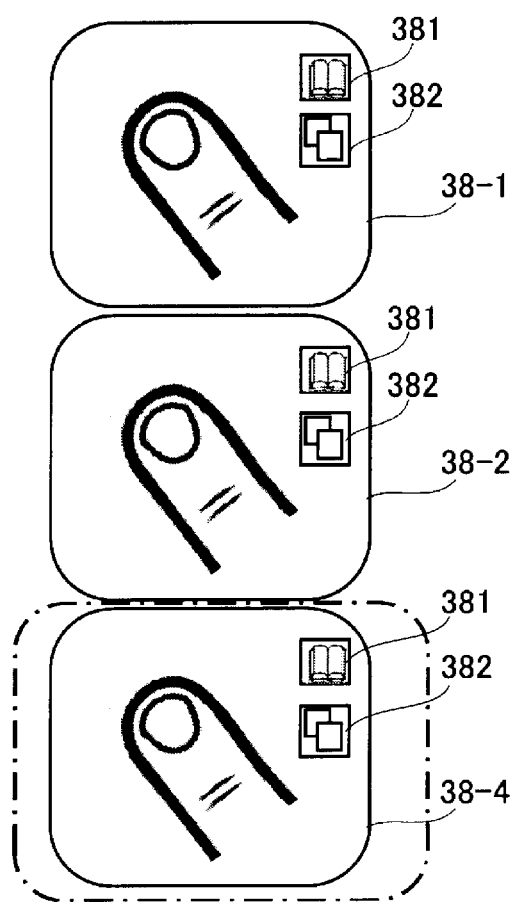

FIG. 12A
FIG. 12B
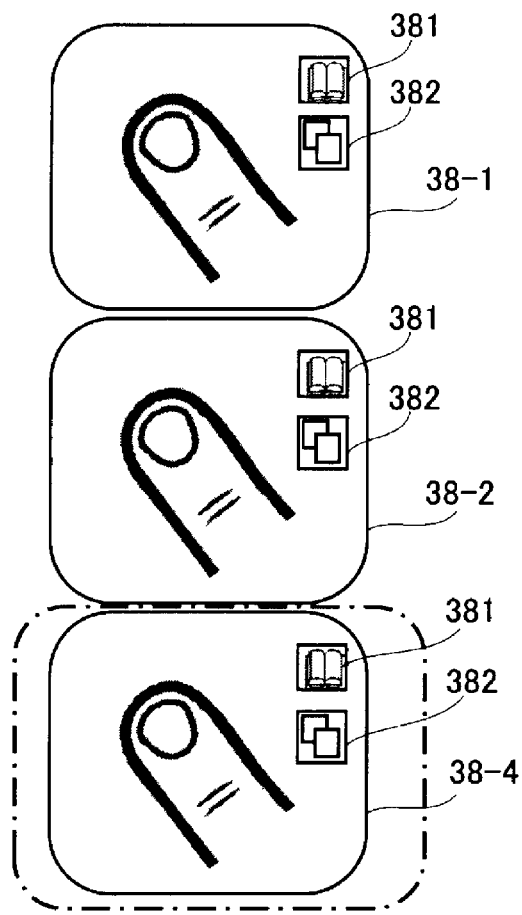
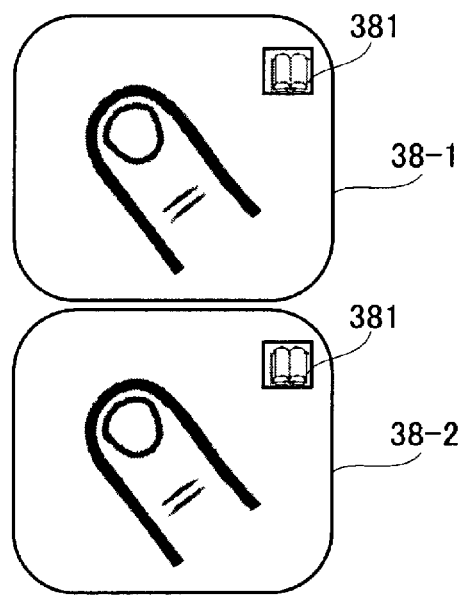

INFORMATION PROCESSING APPARATUS AND NON-TRANSITORY COMPUTER READABLE MEDIUM FOR DISPLAYING INFORMATION INDICATING DIFFERENCE IN SETTING VALUE OF APPLICATIONS

CROSS-REFERENCE TO RELATED APPLICATIONS

This application is based on and claims priority under 35 USC 119 from Japanese Patent Application No. 2017-100135 filed May 19, 2017.

BACKGROUND

(i) Technical Field

The present invention relates to an information processing apparatus and a non-transitory computer readable medium.

(ii) Related Art

For multifunction machines having plural functions such as copying, printing, and fax, techniques for displaying, on a screen of a list of applications, icons for calling macro settings of the applications registered in advance have been proposed.

Operability improves if an icon corresponding to an application obtained by changing an initial value of an original application is created and the application starts immediately after the icon is touched. In this case, however, since the application starts with a single touch, a setting screen indicating the change to the initial value relating to the icon is not displayed. A technique for enabling a user to easily understand such a change in a setting value, therefore, is required.

Although it is possible to understand a change in a setting value if a certain shape or color of an icon or a combination of the certain shape or color and a name of the icon is used in a home screen, it is difficult to understand all changes in setting values if the home screen is limited in size. This is especially evident if there are plural icons similar to one another. If information regarding all setting values that have been changed is displayed along with icons, the amount of information displayed might become too large, and visibility might decrease.

SUMMARY

According to an aspect of the invention, there is provided an information processing apparatus including a display that displays a first operator corresponding to a standard application and a second operator corresponding to a one-touch application of a same type that is obtained by changing a setting value of a function of the standard application and that starts if the second operator is touched and a controller that displays, in association with the second operator, information indicating a difference in the setting value.

BRIEF DESCRIPTION OF THE DRAWINGS

An exemplary embodiment of the present invention will be described in detail based on the following figures, wherein:

FIGS. 8A and 8B are fifth diagrams illustrating changes in how badges are displayed on one-touch application icons;

FIGS. 11A and 11B are eighth diagrams illustrating changes in how badges are displayed on one-touch application icons;

FIGS. 12A and 12B are ninth diagrams illustrating changes in how badges are displayed on the one-touch application icons;

DETAILED DESCRIPTION

An exemplary embodiment of the present invention will be described hereinafter with reference to the drawings while taking an image processing apparatus as an example of an information processing apparatus.

Overall Configuration of System

Figure 1:
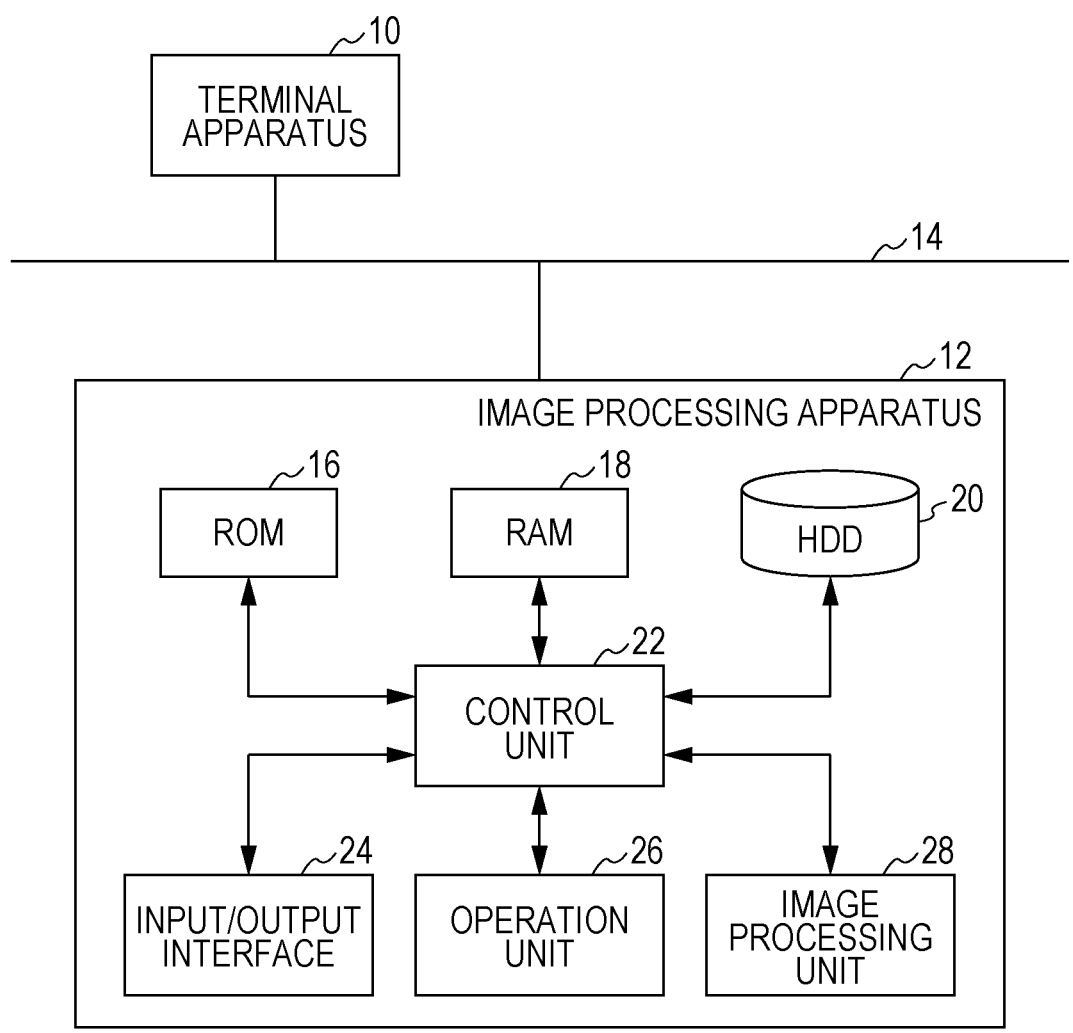
FIG. 1 a diagram illustrating the configuration of a system according to an exemplary embodiment.

FIG. 1 is a block diagram illustrating the configuration of an image processing system including an image processing apparatus according to an exemplary embodiment. The image processing system includes a terminal apparatus 10 and an image processing apparatus 12. The terminal apparatus 10 and the image processing apparatus 12 are connected to each other through a communication medium 14. The communication medium 14 is a data communication network such as a local area network (LAN).

The terminal apparatus 10 is connected to the image processing apparatus 12 through the communication medium 14 and transmits a print job including a command for printing a document, for example, in accordance with an instruction from a user.

The image processing apparatus 12 includes a read-only memory (ROM) 16, a random-access memory (RAM) 18, a hard disk drive (HDD) 20, a control unit 22 including one or more central processing units (CPUs), an input/output interface 24, an operation unit 26 such as a touch panel, and an image processing unit 28.

The control unit 22 including the one or more CPUs receives a print job command or the like from the terminal apparatus 10 through the input/output interface 24 in accordance with a processing program stored in the ROM 16. The control unit 22 generates intermediate data by interpreting page description language (PDL) data and then generates drawing data (raster data) on the basis of the generated intermediate data. The control unit 22 also executes various commands received from the operation unit 26 such as copying, scanning, and fax.

The operation unit 26 displays various screens including a home screen on the basis of instructions from the control unit 22. The home screen includes operators (icons) corresponding to applications, and the user starts an application by operating (touching) a corresponding icon.

The image processing unit 28 includes a printing module, a scanning module, a fax module, a paper feed module, a document feed module, and an image processing accelerator.

The printing module has a function of outputting an image onto a sheet of paper. The printing module employs a known inkjet method, for example, and prints drawing data on a sheet of paper. More specifically, the printing module performs recording on a sheet of paper, a film, or the like by ejecting liquid ink or melted solid ink from nozzles or the like. A method for ejecting ink may be a drop-on-demand method (pressure pulse method), in which ink is ejected through electrostatic induction, a thermal inkjet method, in which ink is ejected under pressure generated by forming and developing air bubbles through heating, or the like. Recording heads include a head for ejecting cyan ink, a head for ejecting magenta ink, a head for ejecting yellow ink, and a head for ejecting black ink, for example, and are line heads having at least the same width as that of a sheet of paper. The recording heads eject the corresponding color inks onto an intermediate transfer member, which in turn transfers the color inks onto a sheet of paper.

The scanning module reads an image from a sheet of paper and converts the image into electronic data.

The fax module includes a modem and a fax image processing module and performs a fax function.

The paper feed module conveys a sheet of paper from a paper tray to the printing module.

The document feed module conveys a sheet of paper from a document tray to the scanning module.

The image processing accelerator is a module that changes the size of an image in combination with the scanning module or the like. The image processing accelerator need not necessarily be included, that is, may be an optional module.

The image processing apparatus 12 may also include a finisher for punching or sorting sheets of paper, an authentication unit that authenticates the user, such as a universal serial bus (USB) port or an integrated circuit (IC) card reader, a charging unit, a person detection sensor, and a face camera.

The image processing apparatus 12 may be connected to the Internet through the communication medium 14 and employ Ethernet or Wi-Fi (registered trademark).

Figure 2:
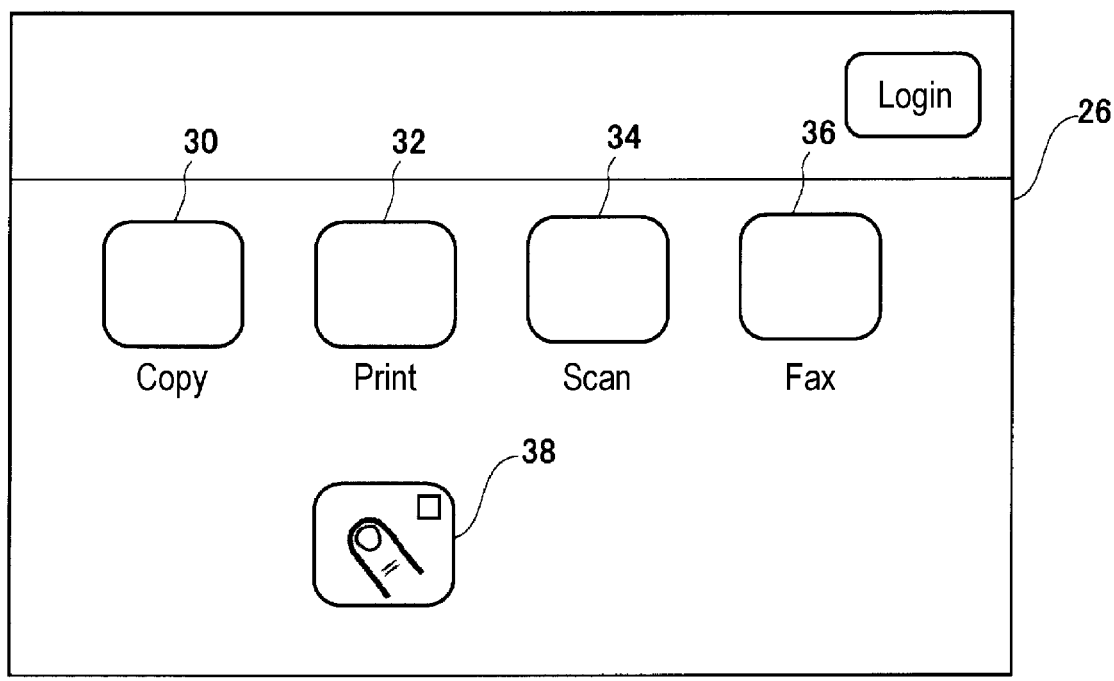
FIG. 2 is a diagram illustrating an example of a screen displayed on an operation unit.

FIG. 2 illustrates an example of the home screen displayed on the operation unit 26. The home screen includes icons corresponding to various applications installed on the image processing apparatus 12. The applications include standard applications installed on the image processing apparatus 12 beforehand and enhanced applications to be arbitrarily added afterward. Furthermore, there are applications obtained by arbitrarily changing setting values of the standard applications. Such applications can be regarded as applications to which macro information has been registered.

In FIG. 2, a copy icon 30, a print icon 32, a scan icon 34, and a fax icon 36 are illustrated as icons corresponding to the standard applications. The control unit 22 displays these icons at certain positions using home screen information including positional information and identification information regarding the icons and identification information regarding the applications corresponding to the icons. If the user touches one of the icons, the control unit 22 receives the operation as a request to operate an application corresponding to the icon and starts the application. That is, upon receiving a request, the control unit 22 displays a setting screen of a corresponding application on the operation unit 26, and the user inputs setting values of various functions on the setting screen. A job then starts in accordance with the input setting values. If the user touches the copy icon 30, for example, the control unit 22 displays a setting screen for inputting setting values of various copying functions, such as the number of copies, magnification, color mode, single-sided/double-sided printing, and N-up printing. After the user inputs the setting values on the setting screen, a copy job starts in accordance with the input setting values. Such a setting screen is disclosed in Japanese Unexamined Patent Application Publication No. 2016-45762, for example, but a type of setting screen is not limited to this. The icons 30 to 36 corresponding to the standard applications function as first operators.

In addition to the icons 30 to 36 corresponding to the standard applications, a one-touch application icon 38 is displayed as an icon corresponding to a one-touch application obtained by changing setting values of a standard application. The control unit 22 displays the one-touch application icon 38 at a certain position using home screen information including positional information and identification information regarding the icon and identification information regarding the application corresponding to the icon. If the user touches the one-touch application icon 38, the control unit 22 receives the operation as a request to operate the application corresponding to the icon and immediately starts the application using the setting values registered in advance. That is, unlike a case in which one of the icons 30 to 36 corresponding to the standard applications is touched, the control unit 22 starts the application corresponding to the one-touch application icon 38 using the setting values registered in advance without displaying a setting screen. If the one-touch application icon 38 corresponds to copying and color mode is set to "color" as a registered setting value, for example, the control unit 22 performs color copying without displaying a setting screen. The application and the setting values are associated with each other as one-touch application information in a memory, and the control unit 22 performs processing while referring to the one-touch application information registered in advance. One-touch application information specifies setting values of functions of an application and differs between applications. In the case of a copy application, the one-touch application information specifies the number of copies, magnification, color mode, single-sided/double-sided printing, N-up printing, and the like, and in the case of a scan application, the one-touch application information specifies color mode, format conversion, a process for reducing the amount of data, an optical character recognition (OCR) process, and the like. The one-touch application icon 38 functions as a second operator.

Since the control unit 22 performs a process using associated setting values without displaying a setting screen immediately after the one-touch application icon 38 is touched, it is desirable for the user to be able to easily understand the setting values associated with the icon just by taking a look at the one-touch application icon 38. Not only when only one one-touch application icon 38 is displayed as in FIG. 2 but also when plural one-touch application icons 38 are displayed, the one-touch application icons 38 need to indicate corresponding setting values. Even when only one one-touch application icon 38 is displayed, the user might desire to easily understand corresponding setting values.

When displaying the one-touch application icon 38 on the operation unit 26, therefore, the control unit 22 displays a certain badge at a certain position (at an upper-right corner in FIG. 2) in association with the one-touch application icon 38 in order to indicate a setting value while superimposing an image (an image of a finger in FIG. 2) indicating that the application starts with a single touch. The badge is information (mark) indicating that the application includes a setting value different from one used in another application. The control unit 22 determines whether setting values are different from each other, and if so, displays a badge in association with an icon concerned. Setting values are compared with each other in the following three manners, and the present exemplary embodiment includes all of the three.

(a) Between a standard application and a one-touch application
(b) Between one-touch applications
(c) Between a standard application and a one-touch application and between one-touch applications In the case of (a), for example, the control unit 22 compares setting values of a standard application and setting values of a one-touch application. The control unit 22 then detects a setting value in which there is a difference and displays a badge corresponding to the setting value in association with a one-touch application icon. Setting values of each application are stored in the memory as setting information in association with the application. The control unit 22 detects a setting value in which there is a difference by referring to the setting information.

Next, badges displayed in association with the one-touch application icon 38 will be described.

Badges Corresponding to Differences Between Standard Application and One-Touch Application FIGS. 3A to 3D illustrate badges displayed after setting values are compared between a standard application and a one-touch application. Although the standard application and the one-touch application are copy applications in the following description, the standard application and the one-touch application are not limited to this. A shape or a color of the one-touch application may be changed depending on a type. In addition, although a finger image 380 indicates that a corresponding application is a one-touch application in FIGS. 3A to 3D, the user may arbitrarily change the image.

Figure 3A:
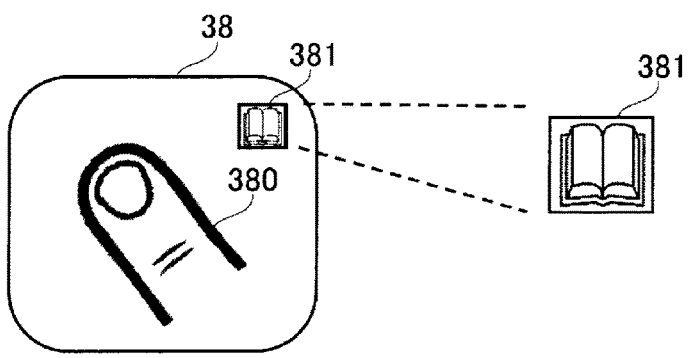
FIGS. 3A to 3D are diagrams illustrating badges displayed on a one-touch application icon.

FIG. 3A illustrates a case in which only the number of copies has been changed from 1, which is an initial value of the standard application, to 2 as a setting value of the function. The control unit 22 compares the setting values of the standard application and the setting values of the one-touch application. After detecting that the setting value of the number of copies has been changed from 1, which is the initial value, to 2, the control unit 22 displays a badge 381 indicating the number of copies at an upper-right corner of the one-touch application icon 38. FIG. 3A also illustrates an enlarged image of the badge 381. The user looks at the badge 381 and understands that the number of copies corresponding to the one-touch application icon 38 has been changed from the initial value. It is to be noted that in FIG. 3A, badges corresponding to setting values of functions that have not been changed from initial values are not displayed.

Figure 3B:
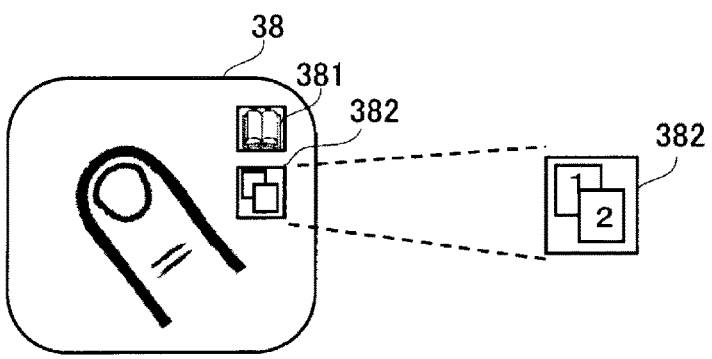

FIG. 3B illustrates a case in which the number of copies has been changed from 1, which is the initial value of the standard application, to 2 and N-up printing has been changed from 1, which is an initial value of the standard application, to 2 as setting values of the functions. The "N-up printing" refers to copying of N pages onto a single page. The control unit 22 compares the setting values of the standard application and the setting values of the one-touch application. After detecting that the setting value of the number of copies has been changed from 1, which is the initial value (default value), to 2 and the setting value of N-up printing has been changed from 1, which is the initial value, to 2, the control unit 22 superimposes the badge 381 indicating the number of copies and a badge 382 indicating N-up printing at the upper-right corner of the one-touch application icon 38. FIG. 3B also illustrates an enlarged image of the badge 382. The user looks at the badges 381 and 382 and understands that the number of copies and N-up printing relating to the one-touch application icon 38 have been changed from the initial values. In FIG. 3B, too, badges corresponding to setting values of functions that have not been changed from initial values are not displayed.

Figure 3C:
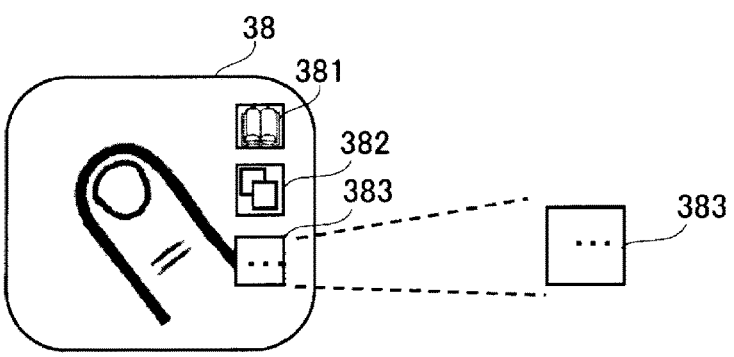

FIG. 3C illustrates a case in which setting values of three or more functions have been changed from initial values of the standard application. For example, FIG. 3C illustrates a case in which the number of copies has been changed from 1, which is the initial value, to 2, N-up printing has been changed from 1, which is the initial value, to 2, and color mode has been changed from "black-and-white" to "color". The control unit 22 compares the setting values of the standard application and the setting values of the one-touch application. After detecting that the setting values of the number of copies, N-up printing, and color mode have been changed from the initial values, the control unit 22 superimposes, upon the one-touch application icon 38 at the upper-right corner, the badges 381 and 382 indicating the number of copies and N-up printing, respectively, and another badge 383 indicating that another setting value has been changed. FIG. 3C also illustrates an enlarged image of the badge 383. The user looks at the badges 381 to 383 and understands that the number of copies, N-up printing, and another function relating to the one-touch application icon 38 have been changed from the initial values.

Although the badge 383 indicates in FIG. 3C that three or more setting values have been changed, the badge 383 may be displayed for changes in four or more setting values, instead, insofar as there is sufficient space. The badge 383 is used to effectively use display space. Furthermore, a badge may or may not be displayed depending on the setting value of a function. For example, a badge is not displayed for the number of copies even if a setting value has been changed, and a badge is displayed for N-up printing if the setting value has been changed.

Figure 3D:
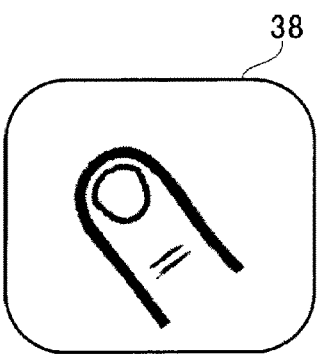

FIG. 3D illustrates a case in which a badge is disabled for a setting value of a particular function, that is, the badge 381 corresponding to the number of copies is disabled. Among the initial values of the standard application, only the number of copies has been changed from 1, which is the initial value, to 2 as a setting value of the function. The control unit 22 compares the setting values of the standard application and the setting values of the one-touch application. Even after detecting that the setting value of the number of copies has been changed from 1, which is the initial value (default value), to 2, however, the control unit 22 does not display the badge 381 indicating the number of copies on the one-touch application icon 38 since the badge 381 is disabled. In this case, too, if the user knows that the badge 381 corresponding to the number of copies is disabled, the user looks at the one-touch application icon 38 illustrated in FIG. 3D and understands that the number of copies has been changed from the initial value (insofar as there is no one-touch application icon 38 whose setting values have not been changed at all from initial values).

Figure 4A:
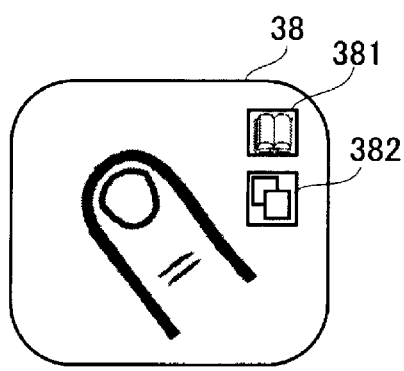
FIGS. 4A and 4B are first diagrams illustrating changes in how badges are displayed on the one-touch application icon.
Figure 4B:
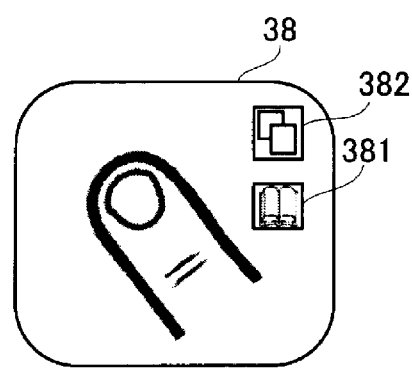

FIGS. 4A and 4B illustrate changes in how badges are displayed when the order of priority of setting values is changed. FIG. 4A illustrates a case in which the number of copies takes priority over N-up printing. The badge 381 indicating the number of copies is superimposed upon the one-touch application icon 38 above the badge 382 indicating N-up printing.

FIG. 4B illustrates a case in which the order of priority has been changed and N-up printing takes priority over the number of printing. The badge 382 indicating N-up printing is superimposed upon the one-touch application icon 38 above the badge 381 indicating the number of copies.

Setting values of a standard application are usually initial values (default values), but the default values may be changed and registered again. In this case, the control unit 22 compares new default values of the standard application and setting values of a one-touch application, detects setting values that have been changed, and displays corresponding badges.

Figure 5A:
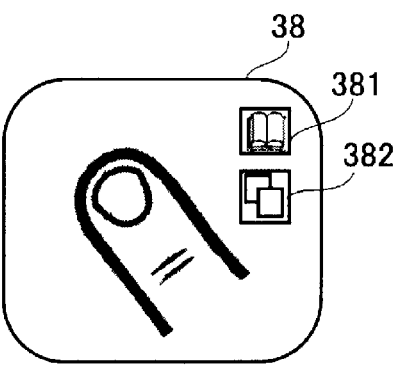
FIGS. 5A and 5B are second diagrams illustrating changes in how badges are displayed on the one-touch application icon.
Figure 5B:
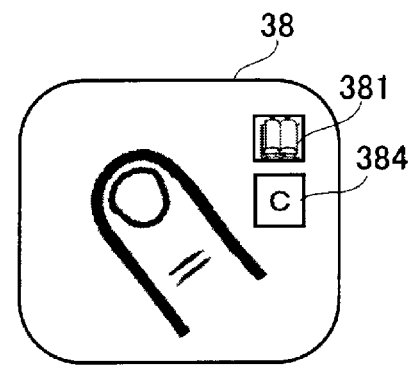

FIGS. 5A and 5B illustrate changes in how badges are displayed when default values of the standard application are changed. FIG. 5A illustrates a case in which setting values (initial values) of the number of copies and N-up printing of the standard application have been changed. The badges 381 and 382 indicating the number of copies and N-up printing, respectively, are superimposed upon the one-touch application icon 38 in the order of priority.

FIG. 5B illustrates a case in which the initial value of the number of copies of the standard application remains the same, the initial value of N-up printing has been changed to the same value as in the one-touch application, and an initial value of color mode, which is "white-and-black", is changed to "color" with the one-touch application displayed. More specifically, the setting values of the number of copies, N-up printing, and color mode of the standard application are 1, 2, and "color", respectively, and the setting values of the number of copies, N-up printing, and color mode of the one-touch application are 2, 2, and "white-and-black", respectively. The control unit 22 compares the new setting values of the standard application and the setting values of the one-touch application. After detecting that there are differences in the number of copies and color mode, the control unit 22 superimposes the badge 381 indicating the number of copies and a badge 384 indicating color mode upon the one-touch application icon 38. Even though the setting values of the one-touch application have not been changed, badges to be displayed are automatically changed since the setting values of the standard application have been changed. More specifically, the badge 382 displayed in FIG. 5A disappears in FIG. 5B due to the change in the corresponding setting value.

Although badges to be displayed are automatically changed in accordance with changes in setting values of the standard application, badges to be displayed may remain the same even if setting values are changed, instead. The user may determine each badge as one that is displayed or not displayed in accordance with a change in a setting value or one that remains displayed or not displayed regardless of a change in the setting value.

The user of the image processing apparatus 12 can be a user (authenticated user) who has logged in using an identifier (ID) and a password or a general user (guest user) who has not logged in. The control unit 22 can provide different applications for each type of user. Standard applications include ones provided for users who have logged in and ones provided for guest users who have not logged in. As a result, standard applications to be compared in order to display badges can be different before and after login.

Figure 6A:
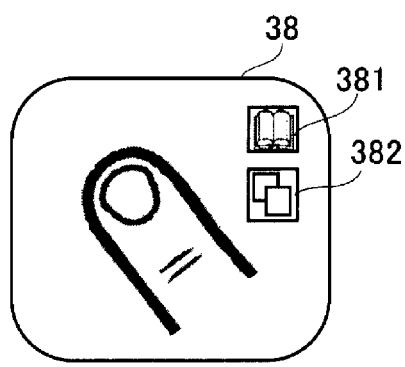
FIGS. 6A and 6B are third diagrams illustrating changes in how badges are displayed on the one-touch application icon.
Figure 6B:
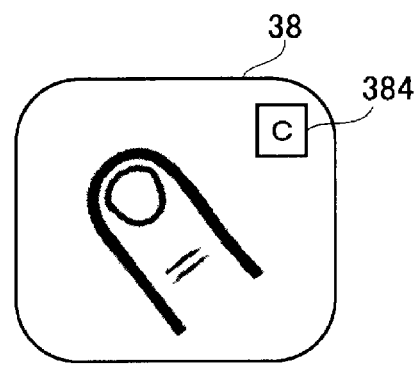

FIGS. 6A and 6B illustrate changes in how badges are displayed before and after login. FIG. 6A illustrates badges displayed before login, and the setting values of the standard application are different from those of the one-touch application in terms of the number of copies and N-up printing. For example, the setting values of the number of copies, N-up printing, and color mode of the standard application before login are 1, 1, and "black-and-white", respectively, and the setting values of the number of copies, N-up printing, and color mode of the one-touch application are 2, 2, and "black-and-white", respectively. The control unit 22 detects that there are differences in the number of copies and N-up printing, and superimposes the badges 381 and 382 indicating the number of copies and N-up printing, respectively.

FIG. 6B illustrates a badge after login, and the setting value of the standard application is different from that of the one-touch application in terms of color mode. For example, the setting values of the number of copies, N-up printing, and color mode of the standard application before login are 2, 2, and "color", respectively, and the setting values of the number of copies, N-up printing, and color mode of the one-touch application are 2, 2, and "black-and-white", respectively. The control unit 22 detects that there is a difference in color mode, and superimposes the badge 384 indicating color mode upon the one-touch application icon 38.

Figure 7A:
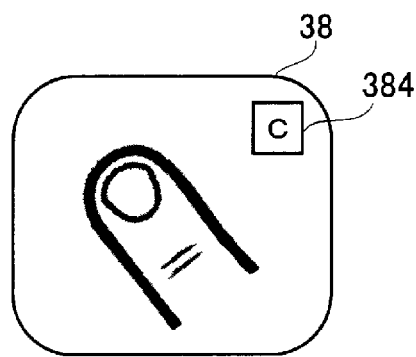
FIGS. 7A and 7B are fourth diagrams illustrating changes in how badges are displayed on the one-touch application icon.
Figure 7B:
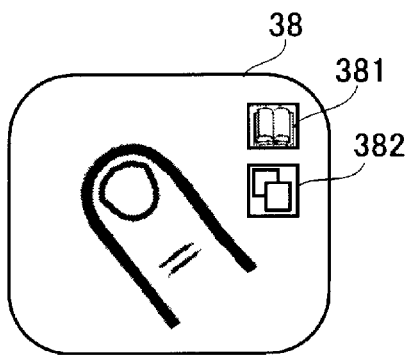

FIGS. 7A and 7B illustrate changes in how badges are displayed before and after logout. FIG. 7A illustrates a badge before logout, and the setting value of the standard application is different from that of the one-touch application in terms of color mode. The control unit 22 detects that there is a difference in color mode, and superimposes the badge 384 indicating color mode upon the one-touch application icon 38.

FIG. 7B illustrates a badge after logout, and the setting values of the standard application are different from those of the one-touch application in terms of the number of copies and N-up printing. The control unit 22 detects that there are differences in the number of copies and N-up printing, and superimposes the badges 381 and 382 indicating the number of copies and N-up printing, respectively, upon the one-touch application icon 38.

Badges corresponding to differences between a standard application and a one-touch application have been described. Next, badges corresponding to differences between one-touch applications will be described.

Badges Corresponding to Differences Between One-Touch Applications

FIGS. 8A and 8B illustrate changes in how badges are displayed when a one-touch application icon is created and displayed and then another one-touch application icon is created and displayed.

FIG. 8A illustrates the one-touch application icon 38. Because there is no other one-touch application icon to be compared, a badge is not superimposed.

FIG. 8B illustrates a case in which another one-touch application is added and there are two one-touch application icons in total. If setting values of a one-touch application icon 38-1 and a one-touch application icon 38-2 are different from each other in terms of the number of copies, the control unit 22 detects that there is a difference in the number of copies, and superimposes the badge 381 indicating the number of copies upon the one-touch application icons 38-1 and 38-2.

Alternatively, the control unit 22 may use different colors or shapes for the one-touch application icons 38-1 and 38-2 to imply that the one-touch application icons 38-1 and 38-2 are different from each other.

Figure 9A:
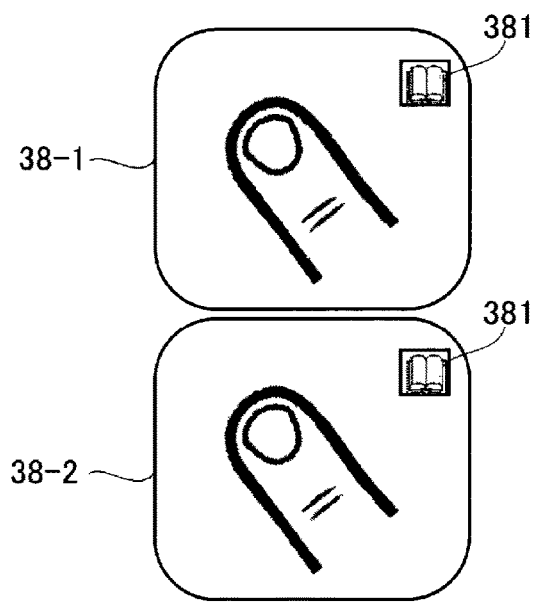
FIGS. 9A and 9B are sixth diagrams illustrating changes in how badges are displayed on one-touch application icons.
Figure 9B:
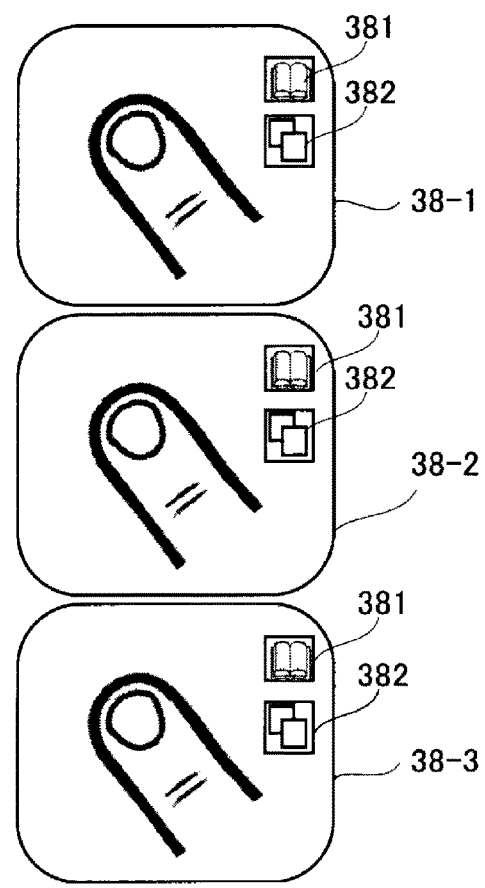

FIGS. 9A and 9B illustrate changes in how badges are displayed when two one-touch application icons are created and displayed and then another one-touch application icon is created and displayed.

FIG. 9A illustrates a case in which the two one-touch application icons 38-1 and 38-2 are displayed. If the setting values of the one-touch applications 38-1 and 38-2 are different from each other in terms of the number of copies, the badge 381 indicating the number of copies is superimposed upon the one-touch application icons 38-1 and 38-2.

FIG. 9B illustrates a case in which another one-touch application is added and there are three one-touch application icons 38-1 to 38-3 in total. If setting values of the three one-touch applications 38-1 to 38-3 are different from one another in terms of the number of copies and N-up printing, the control unit 22 superimposes the badges 381 and 382 indicating the number of copies and N-up printing, respectively, upon the one-touch application icons 38-1 to 38-3.

If at least any of the setting values of one of the three one-touch applications 38-1 to 38-3 is different from a setting value of another one-touch application, the control unit 22 displays a badge corresponding to the setting value.

Figure 10A:
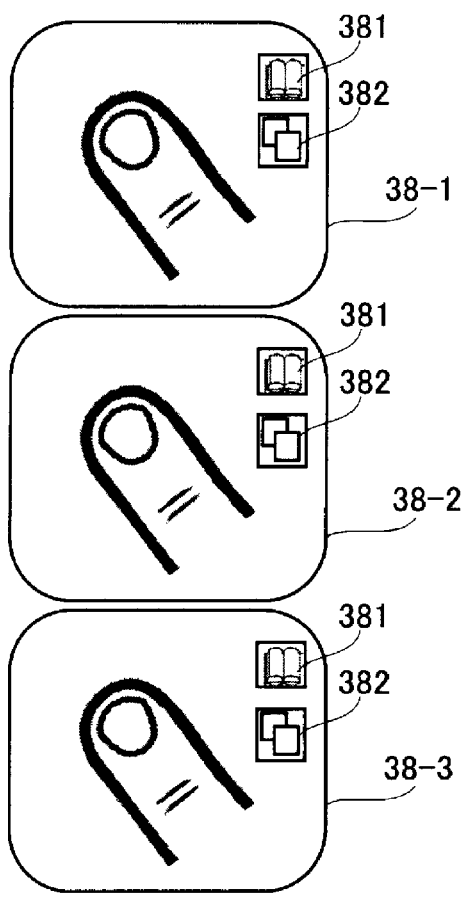
FIGS. 10A and 10B are seventh diagrams illustrating changes in how badges are displayed on the one-touch application icons.
Figure 10B:
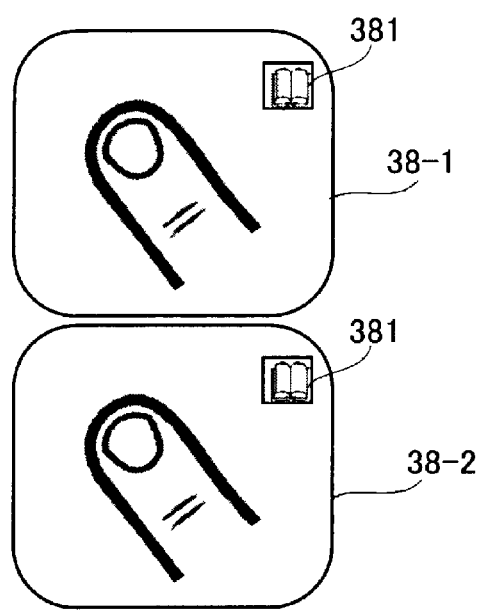

FIGS. 10A and 10B illustrate changes in how badges are displayed when one of the three application icons 38-1 to 38-3 is removed.

FIG. 10A illustrates a case in which the three one-touch application icons 38-1 to 38-3 are displayed. If the setting values of the three one-touch application icons 38-1 to 38-3 are different from one another in terms of the number of copies and N-up printing, the control unit 22 detects the differences in the number of copies and N-up printing, and superimposes the badges 381 and 382 indicating the number of copies and N-up printing, respectively, upon the one-touch application icons 38-1 to 38-3.

FIG. 10B illustrates a case in which the one-touch application icon 38-3 has been removed among the three one-touch application icons 38-1 to 38-3. If the setting values of the remaining two one-touch application icons 38-1 and 38-2 are different from each other in terms of the number of copies, the control unit 22 detects the difference in the number of copies and superimposes the badge 381 indicating the number of copies upon the one-touch application icons 38-1 and 38-2. The badge 382 is not displayed.

FIGS. 11A and 11B illustrate changes in how badges are displayed before and after login. FIG. 11A illustrates a state before login, in which the two one-touch application icons 38-1 and 38-2 are displayed. If the setting values of the one-touch application icons 38-1 and 38-2 are different from each other in terms of the number of copies, the control unit 22 superimposes the badge 381 indicating the number of copies upon the one-touch application icons 38-1 and 38-2.

FIG. 11B illustrates badges displayed after the user logs in. If the user has a private one-touch application, the control unit 22 displays a private one-touch application icon 38-4 on the operation unit 26 after the user logs in. The control unit 22 then compares the setting values of the one-touch applications 38-1 and 38-2 and setting values of the private one-touch application of the user and displays badges corresponding to setting values in which there are differences. If the setting values of the three one-touch applications are different from one another in terms of the number of copies and N-up printing, the control unit 22 superimposes the badges 381 and 382 indicating the number of copies and N-up printing, respectively, upon the one-touch application icons 38-1, 38-2, and 38-4.

FIGS. 12A and 12B illustrate changes in how badges are displayed before and after logout. FIG. 12A illustrates a state before logout, in which the private one-touch application icon 38-4 of the user is displayed along with the two one-touch application icons 38-1 and 38-2. If the setting values of the three one-touch applications are different from one another in terms of the number of copies and N-up printing, the control unit 22 superimposes the badges 381 and 382 indicating the number of copies and N-up printing, respectively, upon the one-touch application icons 38-1, 38-2, and 38-4.

FIG. 12B illustrates a state after the user logs out. The control unit 22 removes the private one-touch application icon 38-4 of the user after the logout and detects differences between the setting values of the remaining two one-touch applications. If the setting values are different from each other in terms of the number of copies, the control unit 22 superimposes the badge 381 indicating the number of copies upon the two one-touch application icons 38-1 and 38-2.

Although one-touch application icons displayed on the operation unit 26 are compared with one another in the above examples, only one-touch application icons grouped in a folder or the like may be compared with one another and badges corresponding to setting values in which there are differences may be displayed, instead.

Figure 13A:
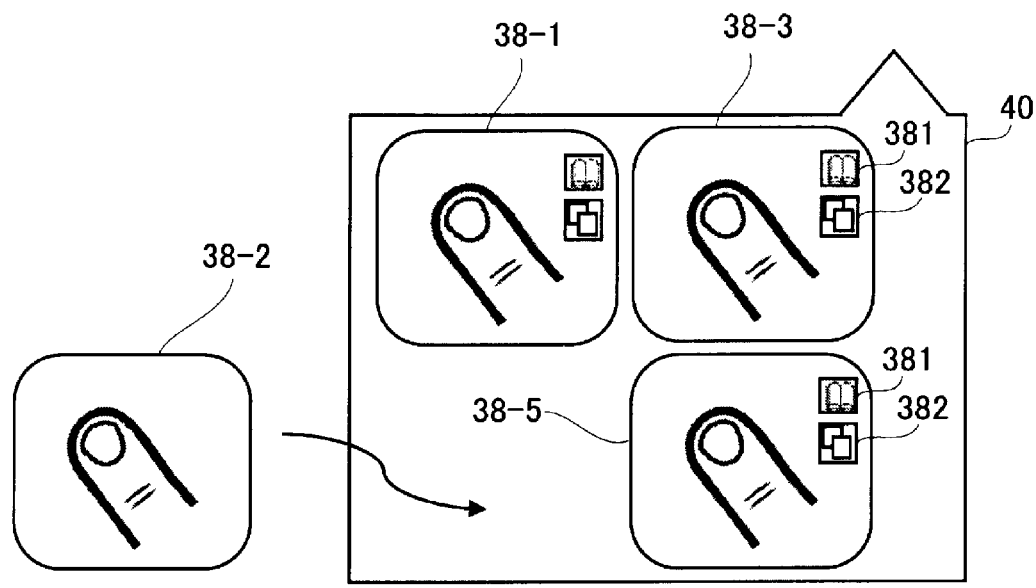
FIGS. 13A and 13B are first diagrams illustrating badges displayed on one-touch application icons grouped in a folder.
Figure 13B:
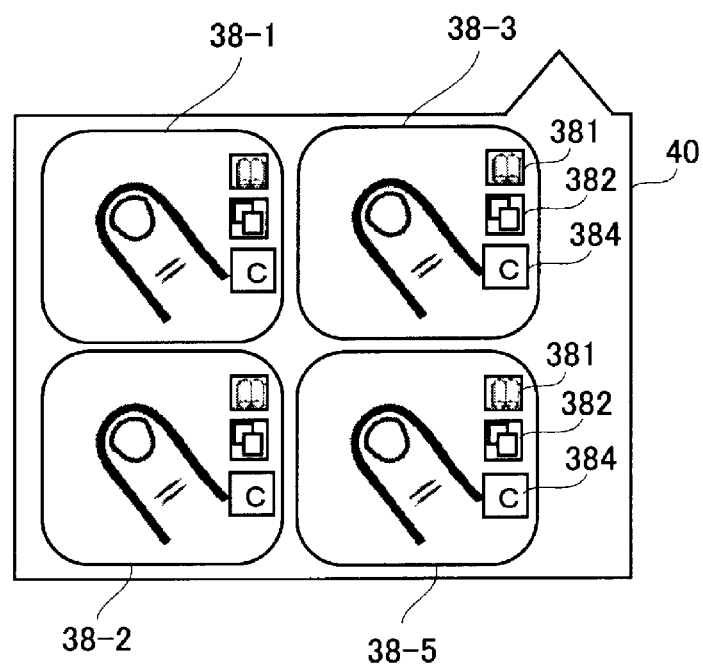

FIGS. 13A and 13B illustrate changes in how badges are displayed when a one-touch application is newly moved (dragged and dropped) into a folder and grouped together with another one-touch application icon or other one-touch application icons. FIG. 13A illustrates a state in which one-touch application icons 38-1, 38-3, and 38-5 are grouped in a folder 40. Setting values corresponding to the one-touch application icons 38-1, 38-3, and 38-5 grouped in the folder 40 are different from one another in terms of the number of copies and N-up printing, and the badges 381 and 382 indicating the number of copies and N-up printing, respectively, are superimposed upon the one-touch application icons 38-1, 38-3, and 38-5. In this state, the one-touch application icon 38-2 outside the folder 40 is dragged and dropped into the folder 40 and grouped together with the one-touch application icons 38-1, 38-3, and 38-5.

FIG. 13B illustrates a case in which the one-touch application icon 38-2 is moved into the folder 40 and grouped together with the one-touch application icons 38-1, 38-3, and 38-5. The control unit 22 detects differences between setting values corresponding to the one-touch application icons 38-1, 38-2, 38-3, and 38-5 grouped in the folder 40. If color mode of the one-touch application corresponding to the one-touch application icon 38-2 is "color" and color mode of the one-touch applications corresponding to the one-touch application icons 38-1, 38-3, and 38-5 is "black-and-white", for example, the control unit 22 newly superimposes the badge 384 indicating color mode upon all the one-touch application icons 38-1, 38-2, 38-3, and 38-5 in the folder 40.

Figure 14A:
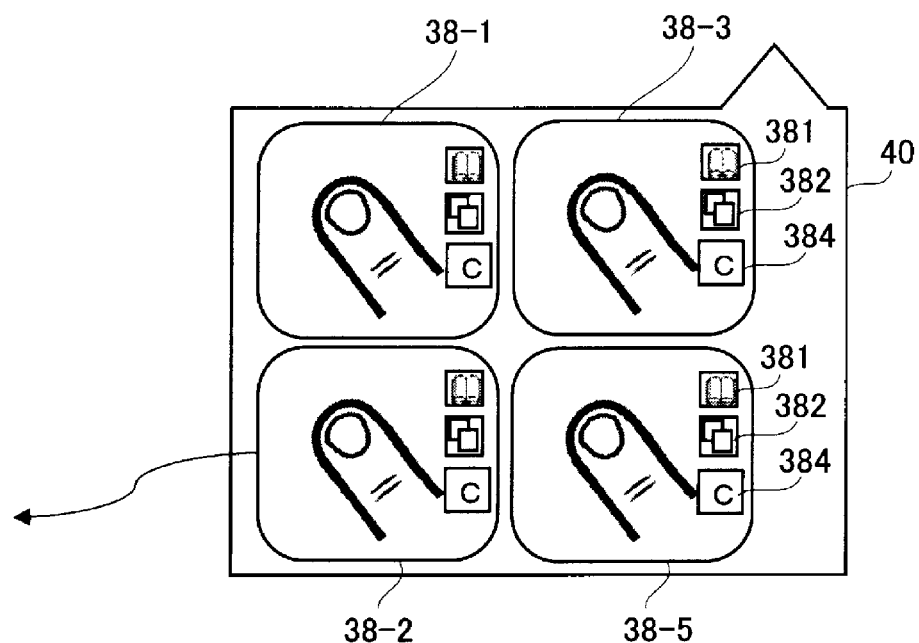
FIGS. 14A and 14B are second diagrams illustrating the badges displayed on the one-touch application icons grouped in the folder.
Figure 14B:
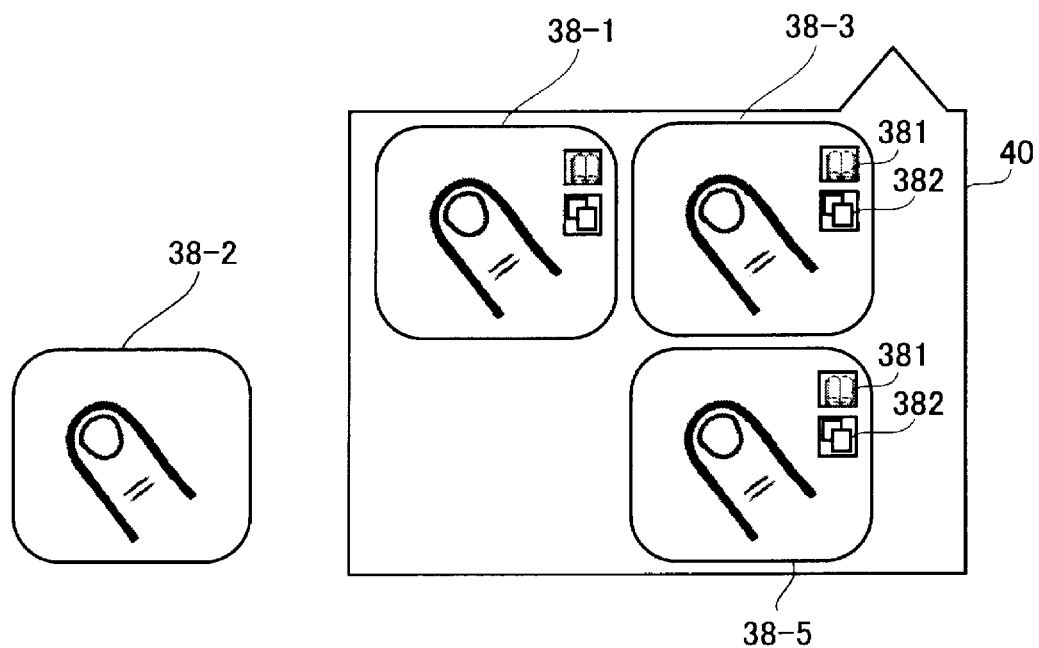

FIGS. 14A and 14B illustrate an opposite case to that illustrated in FIGS. 13A and 13B. That is, FIGS. 14A and 14B illustrate changes in how badges are displayed when one of the one-touch application icons 38-1, 38-2, 38-3, and 38-5 grouped in the folder 40 is removed.

FIG. 14A illustrates a state in which the one-touch application icons 38-1, 38-2, 38-3, and 38-5 are grouped in the folder 40. The control unit 22 compares the setting values corresponding to the one-touch application icons 38-1, 38-2, 38-3, and 38-5 in the folder 40 and displays badges corresponding to setting values in which there are differences. In FIG. 14A, the setting values are different from one another in terms of the number of copies, N-up printing, and color mode, and the control unit 22 displays the badges 381, 382, and 384.

FIG. 14B illustrates a state in which the one-touch application icon 38-2 is dragged and dropped from the folder 40 in the state illustrated in FIG. 14A and gets out of the group. The control unit 22 newly compares the setting values corresponding to the one-touch application icons 38-1, 38-3, and 38-5 remaining in the folder 40 and displays badges corresponding to setting values in which there are differences. In FIG. 14B, the setting values are different from one another in terms of the number of copies and N-up printing, and the control unit 22 displays the badges 381 and 382. Since the setting values corresponding to the one-touch application icon 38-2 are no longer compared with the setting values of the other icons, no badge is superimposed.

Although setting values corresponding to one-touch application icons grouped in a folder are compared with one another in FIGS. 13A to 14B, setting values corresponding to one-touch application icons having another attribute in common, such as names, may be compared with one another, instead.

Figure 15A:
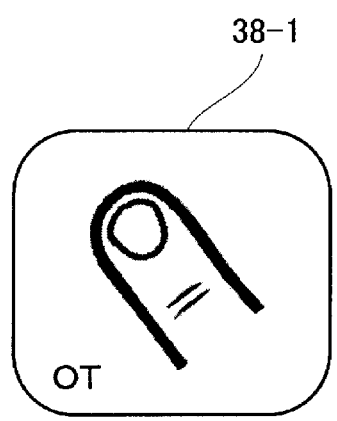
FIGS. 15A to 15C are diagrams illustrating a badge displayed on the one-touch application icons grouped by name.
Figure 15B:
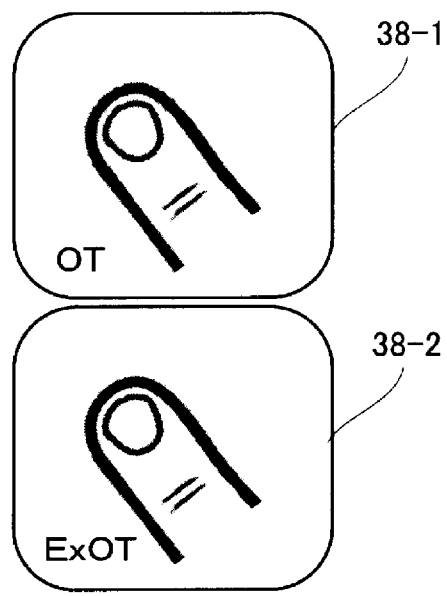
Figure 15C:
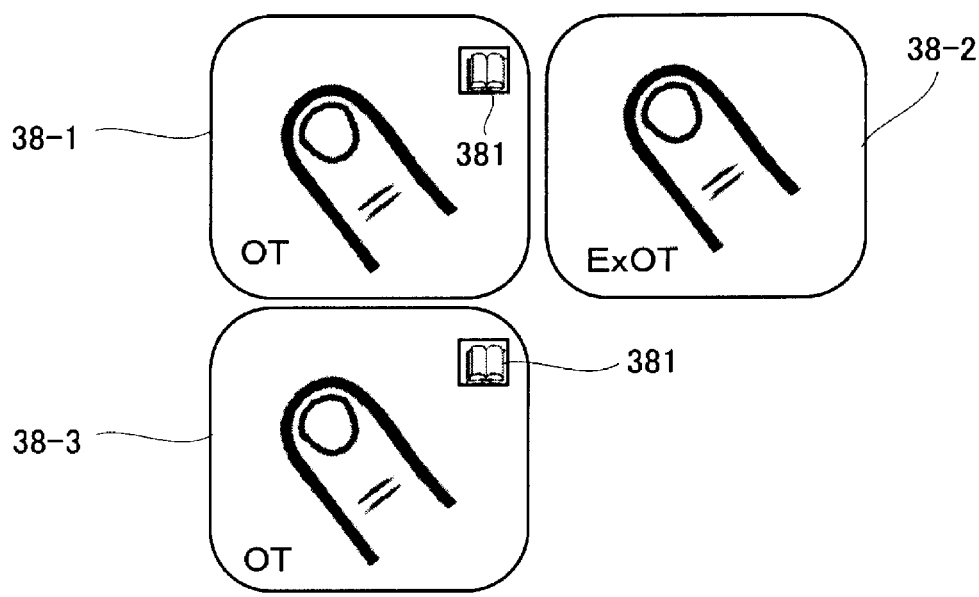

FIGS. 15A to 15C illustrate changes in how badges are displayed when only setting values corresponding to one-touch application icons whose names are the same are to be compared with each other. FIG. 15A illustrates a case in which there is only one one-touch application icon 38-1 whose name is "OT". Since there is no other one-touch application icon to be compared, badges corresponding to setting values in which there are differences are not displayed.

FIG. 15B illustrates a case in which another one-touch application icon 38-2 has been created. A name of the one-touch application icon 38-2 is "ExOT". The control unit 22 compares the names of the one-touch application icons 38-1 and 38-2, determines that the names are different from each other, and does not compare setting values corresponding to the one-touch application icons 38-1 and 38-2 with each other. More specifically, the control unit 22 compares only setting values corresponding to one-touch application icons whose names are "OT" with each other. Since the name of the one-touch application icon 38-2 is not "OT", the control unit 22 does not compare the setting values corresponding to the one-touch application icon 38-2 with the setting values corresponding to the one-touch application icon 38-1.

FIG. 15C illustrates a case in which yet another one-touch application icon 38-3 has been created. A name of the one-touch application icon 38-3 is "OT". The control unit 22 compares setting values corresponding to the one-touch application icons 38-1 and 38-3, whose names are the same, with each other and displays badges corresponding to setting values in which there are differences. If the setting values of one-touch applications corresponding to the one-touch application icons 38-1 and 38-3 are different from each other in terms of the number of copies, the control unit 22 displays the badge 381 indicating the number of copies.

Next, a flowchart of a process performed by the control unit 22 will be described. It is assumed here that setting values of a standard application and setting values of one-touch application are stored in a memory such as a rewritable ROM or the HDD 20 as setting value information. A table representing shapes and colors of badges to be displayed for the setting values are also stored as badge information, and the priority of the badges to be displayed and the number of badges that can be displayed are stored as display parameters. In addition, authentication information necessary to authenticate the user is also stored in the memory, and setting values unique to the user are also stored as setting value information. Furthermore, if plural applications are grouped in a folder or the like, information regarding the grouping is stored in the memory as application information.

Figure 16:
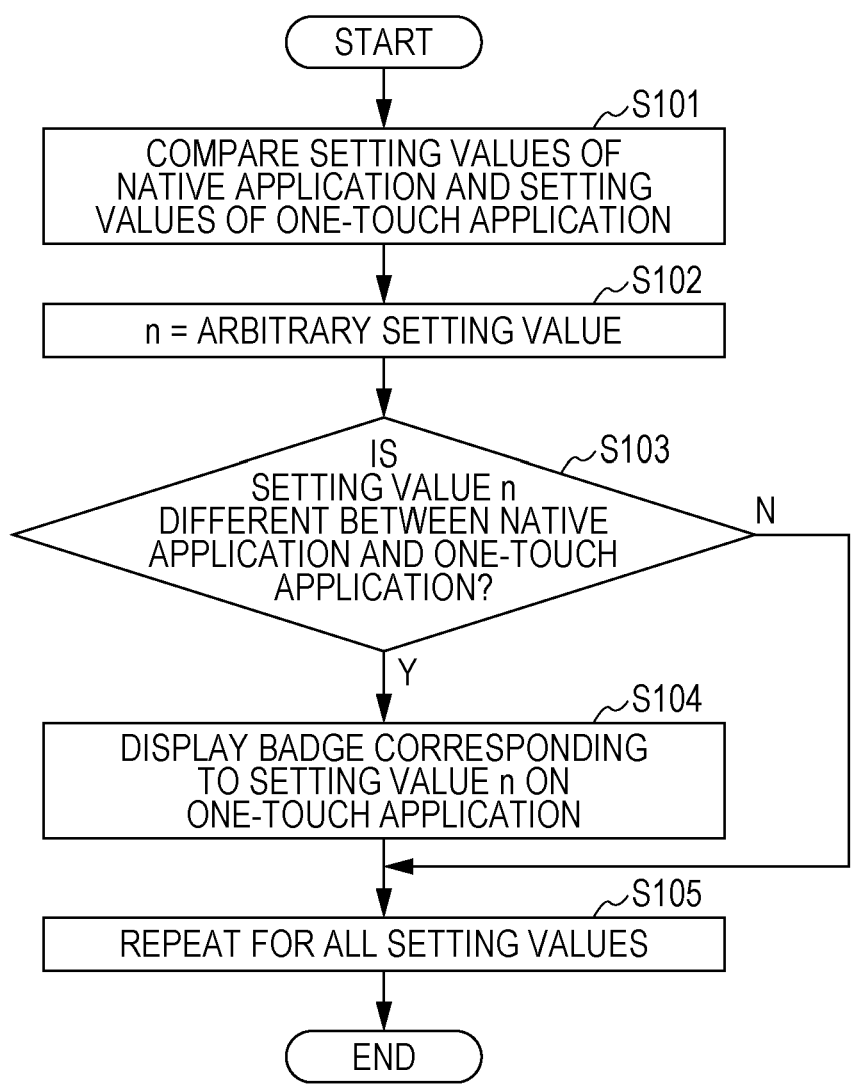
FIG. 16 is a first flowchart illustrating a process according to the exemplary embodiment.

FIG. 16 is a flowchart illustrating a process for displaying badges corresponding to differences between a standard application and a one-touch application. In the following description, the standard application will be referred to as a "native application" as necessary.

First, the control unit 22 refers to the setting value information stored in the memory and compares setting values of the native application and setting values of the one-touch application (S101). The control unit 22 determines n as an identification number of the setting value (S102) and then determines whether the setting value n is different between the native application and the one-touch application (S103). For example, the control unit 22 determines n=1, n=2, and n=3 as the number of copies, N-up printing, and color mode, respectively, and then determines whether the setting value of n=1, namely the number of copies, is different between the native application and the one-touch application. If the number of copies of the native application is 1 and the number of copies of the one-touch application is 1, the control unit 22 determines that there is no difference. If the number of copies of the native application is 1 and the number of copies of the one-touch application is 2, the control unit 22 determines that there is a difference.

If a result of S103 is YES, that is, if there is a differences in the setting value, the control unit 22 refers to the badge information stored in the memory and displays a badge corresponding to the setting value n=1, namely the number of copies, in association with the one-touch application (S104). If the result of S103 is NO, that is, if there is no difference in the setting value, on the other hand, the control unit 22 does not display a badge corresponding to the setting value. The control unit 22 repeats the above process for all the setting values n (S105). As a result, the badges 381 to 383 illustrated in FIGS. 3A to 3C, for example, are displayed in association with the one-touch application icon 38. After displaying the badges in association with the one-touch application icon, the control unit 22 newly registers badge display information to home screen information. More specifically, the badge display information indicates correspondences between displayed badges and a one-touch application icon.

The number of setting values n can be different between types of job, that is, types of application. In the case of a copy application, for example, the number of setting values n is five if the number of copies, N-up printing, color mode, magnification, single-sided/double-sided printing can be set.

In FIG. 16, after a flag is set for setting values n determined to be YES in S103 and all the setting values are subjected to the determination, badges corresponding to the setting values for which flags have been set may be displayed in association with the one-touch application icon.

Figure 17:
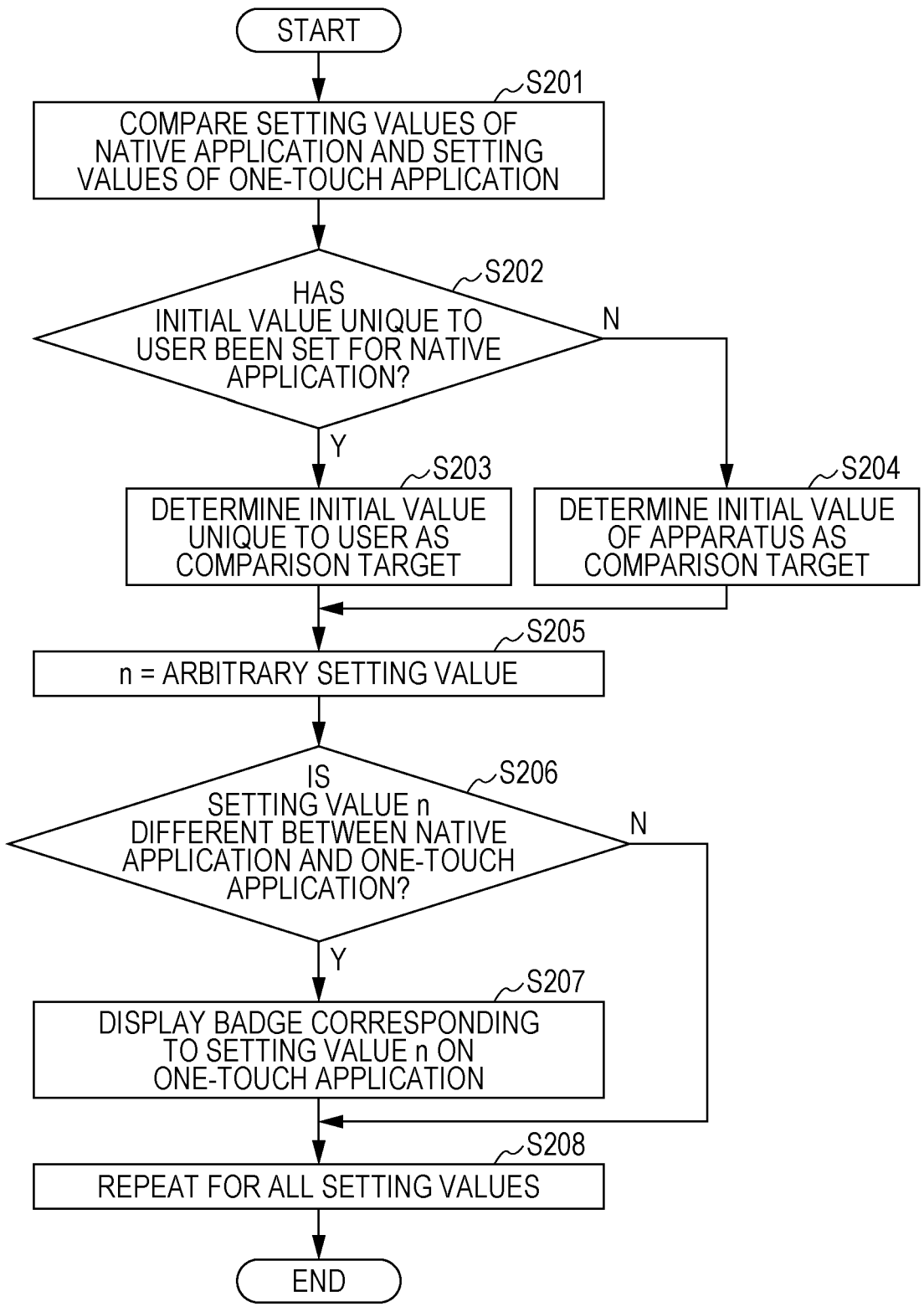
FIG. 17 is a second flowchart illustrating a process according to the exemplary embodiment.

FIG. 17 is a flowchart illustrating a process for displaying badges corresponding to differences between a native application and a one-touch application at a time when an initial value unique to the user has been set for the native application.

First, the control unit 22 refers to the setting value information stored in the memory and compares setting values of the native application and setting values of the one-touch application (S201). The control unit 22 determines whether an initial value unique to the user has been set for the native application (S202). If so, the control unit 22 determines the initial value unique to the user stored in the setting value information as a comparison target (S203), and if not, the control unit 22 determines an initial value of the apparatus stored in the setting value information as a comparison target (S204). The initial value of the apparatus is a default value.

Next, the control unit 22 determines n as an identification number of a setting value (S205) and then determines whether the setting value n is different between the native application and the one-touch application (S206). For example, the control unit 22 determines n=1, n=2, and n=3 as the number of copies, N-up printing, and color mode, respectively, and then determines whether the setting value of n=1, namely the number of copies, is different between the native application and the one-touch application. If the setting value of the number of copies of the native application unique to the user (in the case of S203) or the initial value of the number of copies of the apparatus (in the case of S204) is 1 and the number of copies of the one-touch application is 1, the control unit 22 determines that there is no difference. If the setting value of the number of copies of the native application unique to the user or the initial value of the number of copies of the apparatus is 1 and the number of copies of the one-touch application is 2, the control unit 22 determines that there is a difference.

If a result of S206 is YES, that is, if there is a difference in the setting value, the control unit 22 refers to the badge information stored in the memory and displays a badge corresponding to the setting value n=1, that is, a badge corresponding to the number of copies, on the one-touch application (S207). If the result of S206 is NO, that is, if there is no difference, on the other hand, the control unit 22 does not display a badge corresponding to the setting value. The control unit 22 repeats the above process for all the setting values n (S208). By performing the process illustrated in FIG. 17 at a certain control timing or at a timing at which the user has set a unique setting value to the native application, a badge to be automatically displayed on the one-touch application when an initial value of the native application has been changed can change. As a result, the badges 381 and 384 illustrated in FIG. 5B, for example, are displayed.

When an initial value unique to the user has been set, an initial value of the native application becomes the initial value unique to the user after the user logs in. A result of S202, therefore, becomes YES, a difference is detected using the initial value unique to the user as a comparison target, and a badge is displayed. As a result, the badge 384 illustrated in FIG. 6B, for example, is displayed.

Figure 18:
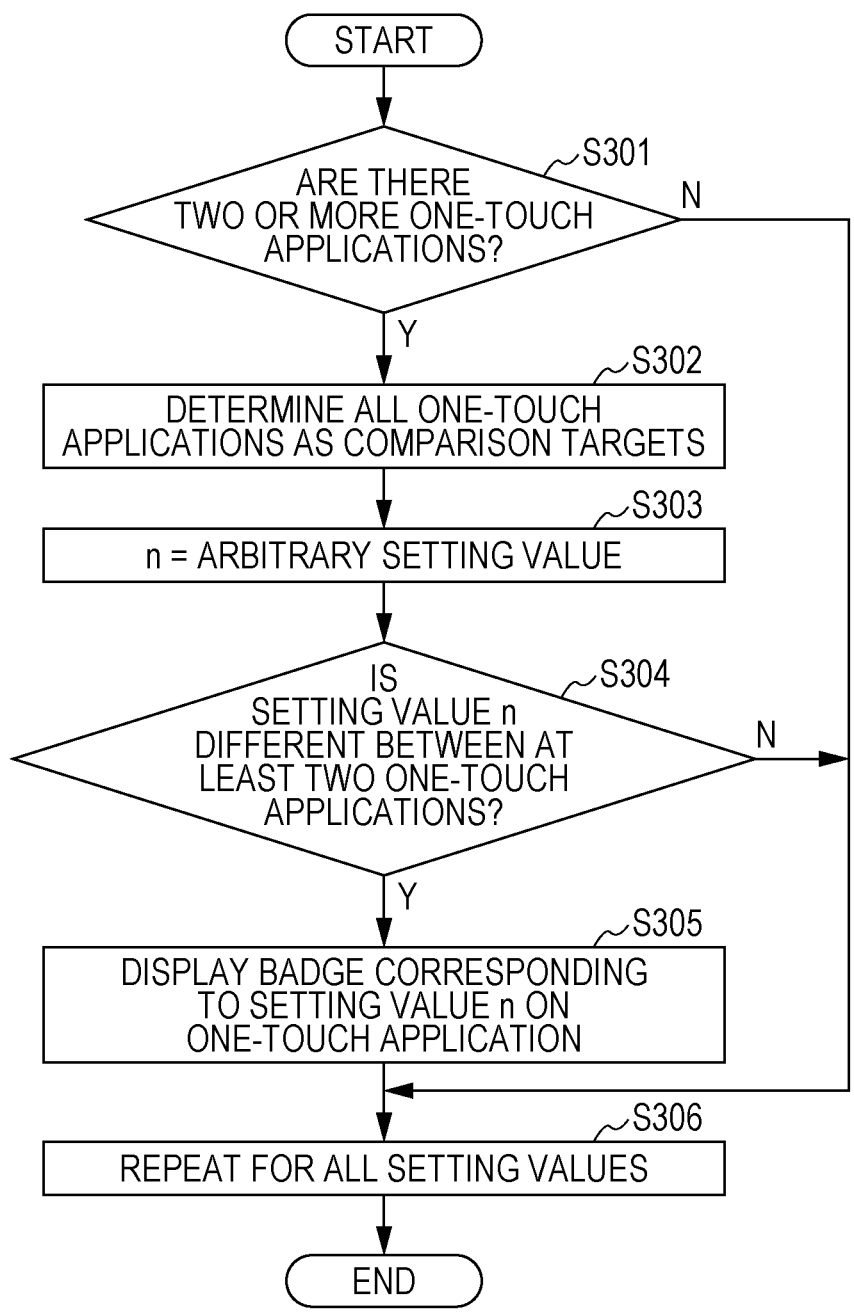
FIG. 18 is a third flowchart illustrating a process according to the exemplary embodiment.

FIG. 18 is a flowchart illustrating a process for displaying badges corresponding to differences between one-touch applications. First, the control unit 22 refers to the home screen information stored in the memory and determines whether there are two or more one-touch applications (S301). If there are two or more one-touch applications, the control unit 22 determines all the one-touch applications as comparison targets (S302). The control unit 22 determines n as an identification number of a setting value (S303) and then determines whether the setting value n is different between at least two one-touch applications (S304). For example, the control unit 22 determines n=1, n=2, and n=3 as the number of copies, N-up printing, and color mode, respectively, and then determines whether the setting value of n=1, namely the number of copies, is different between at least two one-touch applications. If there are three one-touch applications A, B, and C, for example, there are three possible combinations (A, B), (B, C), and (A, C). The control unit 22 makes the determination in S304 on each of the combinations and determines whether the setting value n is different between two one-touch applications. If a result of S304 is YES, that is, if there is a difference in the setting value n, the control unit 22 displays a badge corresponding to the setting value n on all the one-touch applications (S305). If the result of S304 is NO for all the combinations, that is, if there is no difference in the setting value n, on the other hand, the control unit 22 does not display a badge. The control unit 22 repeats the above process for all the setting values n (S306). As a result, the badges 381 and 382 illustrated in FIGS. 8B and 9B, for example, are displayed.

If there is only one one-touch application (NO in S301), a badge is not displayed.

Figure 19:
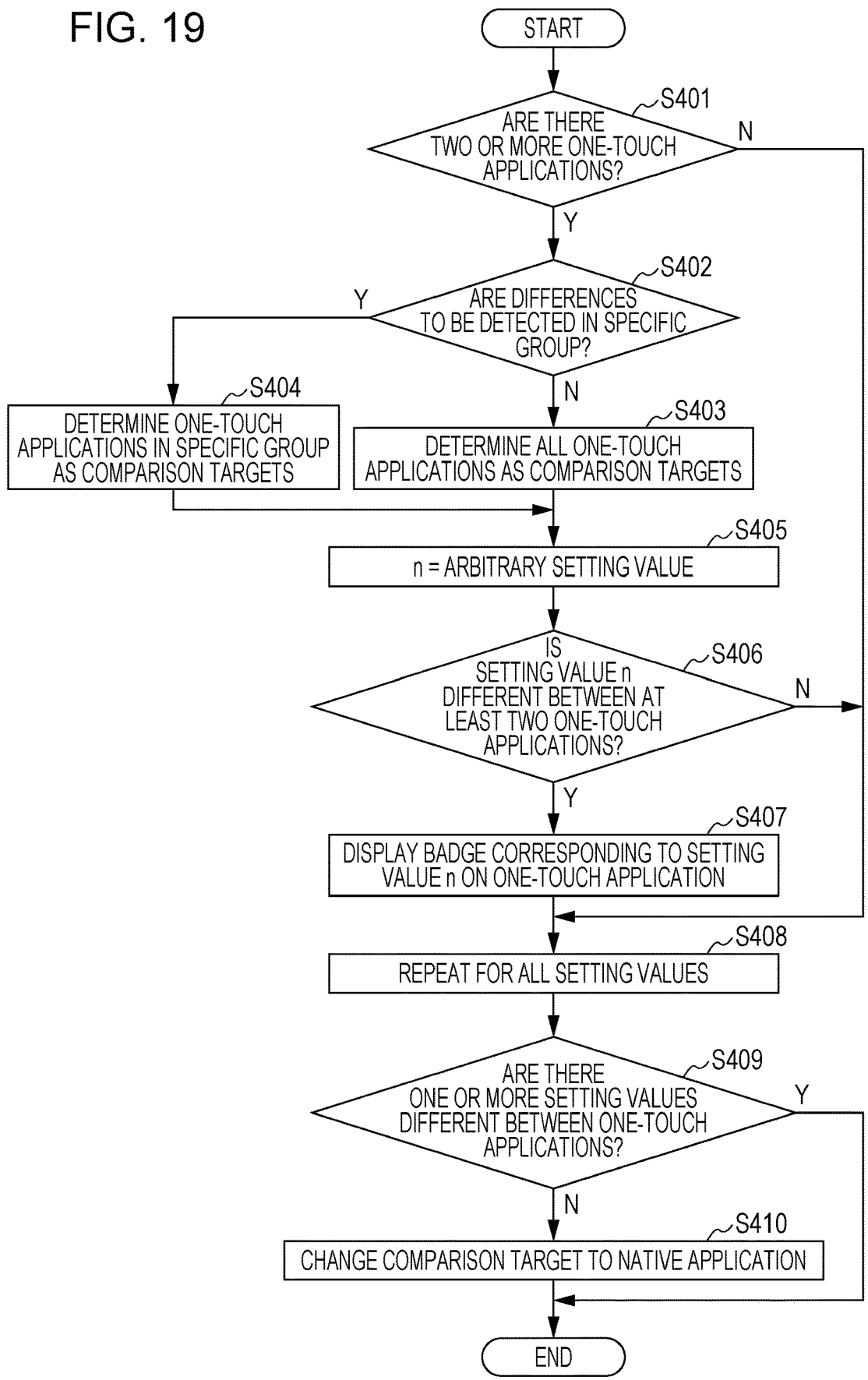
FIG. 19 is a fourth flowchart illustrating a process according to the exemplary embodiment.

FIG. 19 is a flowchart illustrating a process for displaying badges corresponding to differences between one-touch applications at a time when grouped one-touch applications are compared with one another. One-touch applications are grouped when arranged in the same folder or given the same name, but may be grouped in another manner.

First, the control unit 22 refers to the home screen information stored in the memory and determines whether there are two or more one-touch applications (S401). If there are two or more one-touch applications, the control unit 22 determines whether differences between setting values are to be detected in a specific group (S402). If the user or a manager of the apparatus has made settings such that differences between setting values in a specific group are to be detected (YES in S402), the control unit 22 determines one-touch applications in the specific group as comparison targets (S404). If not (NO in S402), on the other hand, the control unit 22 determines all the one-touch applications as comparison targets (S403).

After determining the comparison targets, the control unit 22 determines n as an identification number of a setting value (S405) and then determines whether the setting value n is different between at least two one-touch applications (S406). For example, the control unit 22 determines n=1, n=2, and n=3 as the number of copies, N-up printing, and color mode, respectively, and then determines whether the setting value of n=1, namely the number of copies, is different between at least two one-touch applications. If a result of S406 is YES, that is, if there is a difference in the setting value n, the control unit 22 displays a badge corresponding to the setting value n on all the one-touch applications (S407). If the result of S406 is NO for all the combinations determined as the comparison targets, that is, if there is no difference in the setting value n, on the other hand, the control unit 22 does not display a badge. The control unit 22 repeats the above process for all the setting values n (S408). As a result, the badges 381, 382, and 384 illustrated in FIG. 13B, for example, are displayed.

The process may end in S408, but in FIG. 19, there are additional steps. That is, the control unit 22 determines whether there are one or more setting values different between one-touch applications (S409). If there is even one setting value different between one-touch applications, the badge remains displayed. If there is no setting value different between one-touch applications (NO in S409), the control unit 22 changes a comparison target to a native application (S410) and performs the process illustrated in the flowchart of FIG. 16 or 17. That is, the control unit 22 determines whether setting values are different between one-touch applications and, if there is no difference in all the setting values, determines whether setting values are different between a native application and a one-touch application. If there is a difference, the control unit 22 displays a badge corresponding to a setting value in which there is a difference. The process illustrated in FIG. 19 can be regarded as a process obtained by combining detection of differences between a native application and a one-touch application and detection of differences between one-touch applications.

Badges corresponding to differences between setting values of a native application and setting values of a one-touch application and badges corresponding to differences between setting values of one-touch applications may be different from each other in terms of shapes, colors, or the like. If there is only one one-touch application, differences between a native application and the one-touch application are detected, which is obvious since S408 and later steps are performed if a result of S401 is NO.

Figure 20:
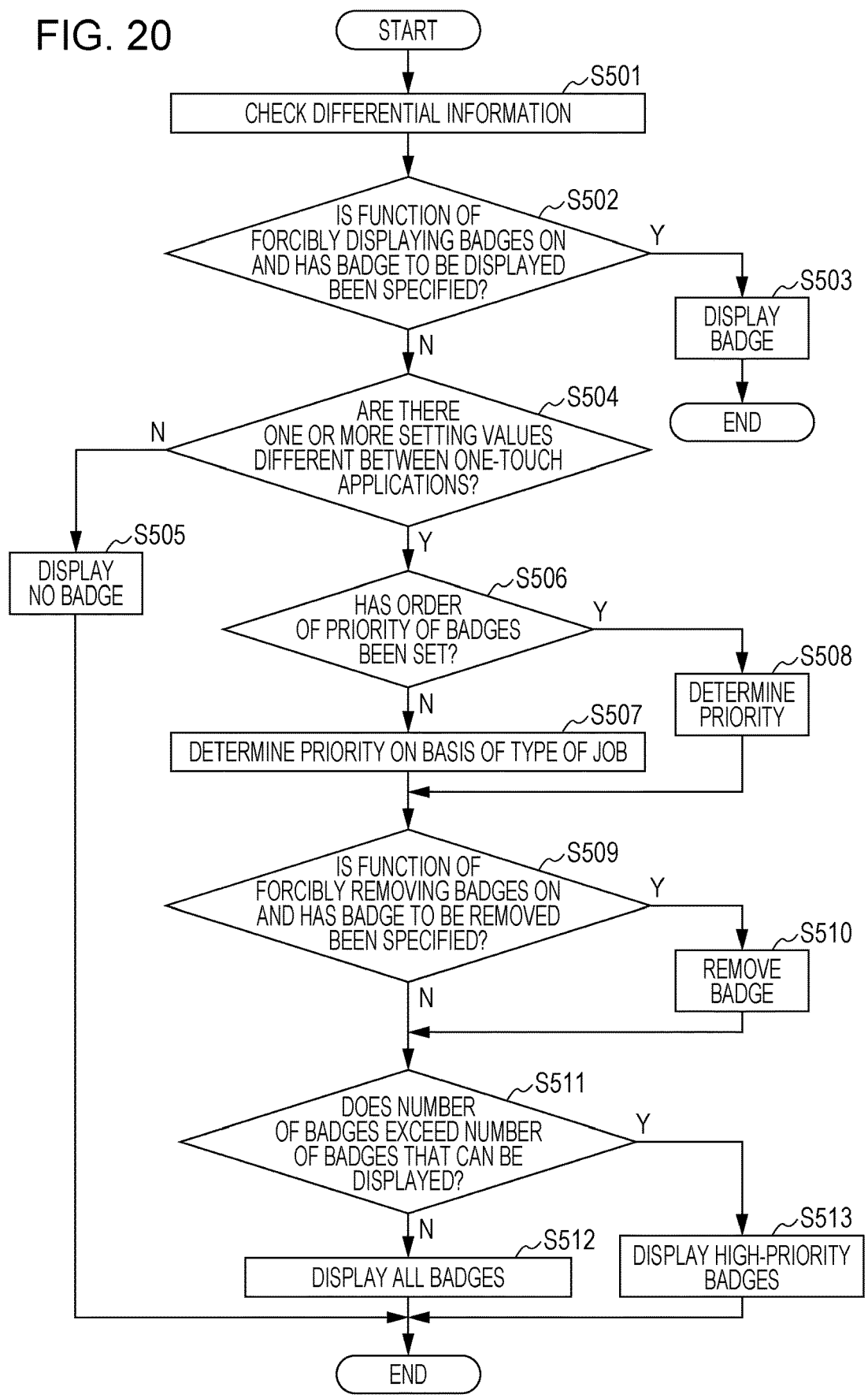
FIG. 20 is a fifth flowchart illustrating a process according to the exemplary embodiment.

FIG. 20 is a flowchart illustrating a process for displaying badges. It is assumed here that on/off switching of forcible display and badge specification information are stored in the memory as badge information.

First, the control unit 22 checks difference information (differential information) regarding setting values (S501) and refers to the badge information stored in the memory to determine whether a function of forcibly displaying badges is on and whether a badge to be displayed has been specified (S502). If a specific badge is to be forcibly displayed, the control unit 22 displays the specific badge (S503). In this case, the specific badge is displayed on a one-touch application regardless of presence or absence of a difference in a setting value. This is effective, for example, when the user desires to highlight a specific one-touch application.

If a result of S502 is NO, on the other hand, the control unit 22 determines whether there are differences in one or more setting values (S504). If not (NO in S504), the control unit 22 does not display a badge (S505). If there are differences in one or more setting values (YES in S504), the control unit 22 determines whether the order of priority of badges has been set (S506). If so (YES in S506), the control unit 22 determines the priority of badges in accordance with the order of priority (S508). For example, badges corresponding to the number of copies, N-up printing, and color mode are displayed in this order. If the order of priority of badges has not been set (NO in S506), the control unit 22 determines the priority of badges on the basis of a type of job (S507). More specifically, for example, in the case of a copy job or a print job, the badges corresponding to the number of copies, N-up printing, and color mode are displayed in this order. In the case of a scan job, for example, badges corresponding to color mode, resolution, and the number of copies are displayed in this order. The priority according to the type of job may be set in advance as a default setting of the apparatus or may be arbitrarily set by the user. After determining the priority of badges, the control unit 22 determines whether the function of forcibly removing badges is on and whether a badge to be removed has been specified (S509). If the function of forcibly removing badges is on and a badge to be removed has been specified (YES in S509), the control unit 22 removes the badge (S510). As a result, even if there is a difference in a setting value, a badge corresponding to the setting value is not displayed. If the badge corresponding to the number of copies has been specified in the case illustrated in FIG. 3D, the badge 381 is not displayed.

If the function of forcibly removing badges is off and a badge to be removed has not been specified (NO in S509), the control unit 22 determines whether the number of badges to be displayed exceeds the number of badges that can be displayed (S511). The number of badges that can be displayed is set to three, for example, in accordance with the size of display space. If the number of badges to be displayed does not exceed the number of badges that can be displayed (NO in S511), the control unit 22 displays all the badges in accordance with the priority determined in S507 or S508 (S512). If the number of badges to be displayed exceeds the number of badges that can be displayed (YES in S511), the control unit 22 displays as many badges as possible in accordance with the priority (S513). Low-priority badges that are not displayed can be displayed as the badge 383 illustrated in FIG. 3C.

The processes illustrated in FIGS. 16 to 20 are achieved by executing processing programs stored in the ROM 16 or the HDD 20 using the control unit 22. Function modules achieved by the control unit 22 are roughly classified as follows.

Comparison Target Identification Module

This is a module for identifying plural applications whose setting values are to be compared with one another. The module has a function of identifying grouped applications and applications removed from groups, a function of identifying applications relating to a user who has not logged in, and a function of identifying applications relating to a user who has logged in.

Comparison Module

This is a module for comparing setting values of applications identified by the comparison target identification module and determining whether there are differences. If an initial value of an application has been changed, the module determines a new setting value as a comparison target.

Badge Display Control Module

This is a module for displaying badges corresponding to setting values in which there are differences using a result of a determination made by the comparison module. The module switches an on/off state of forcible display and determines whether a badge to be displayed or removed has been specified, the priority, and the number of badges that can be displayed.

At least one of these functions may be achieved by a hardware process. The hardware process may be performed using a circuit such as an application-specific integrated circuit (ASIC) or a field-programmable gate array (FPGA).

Figure 21:
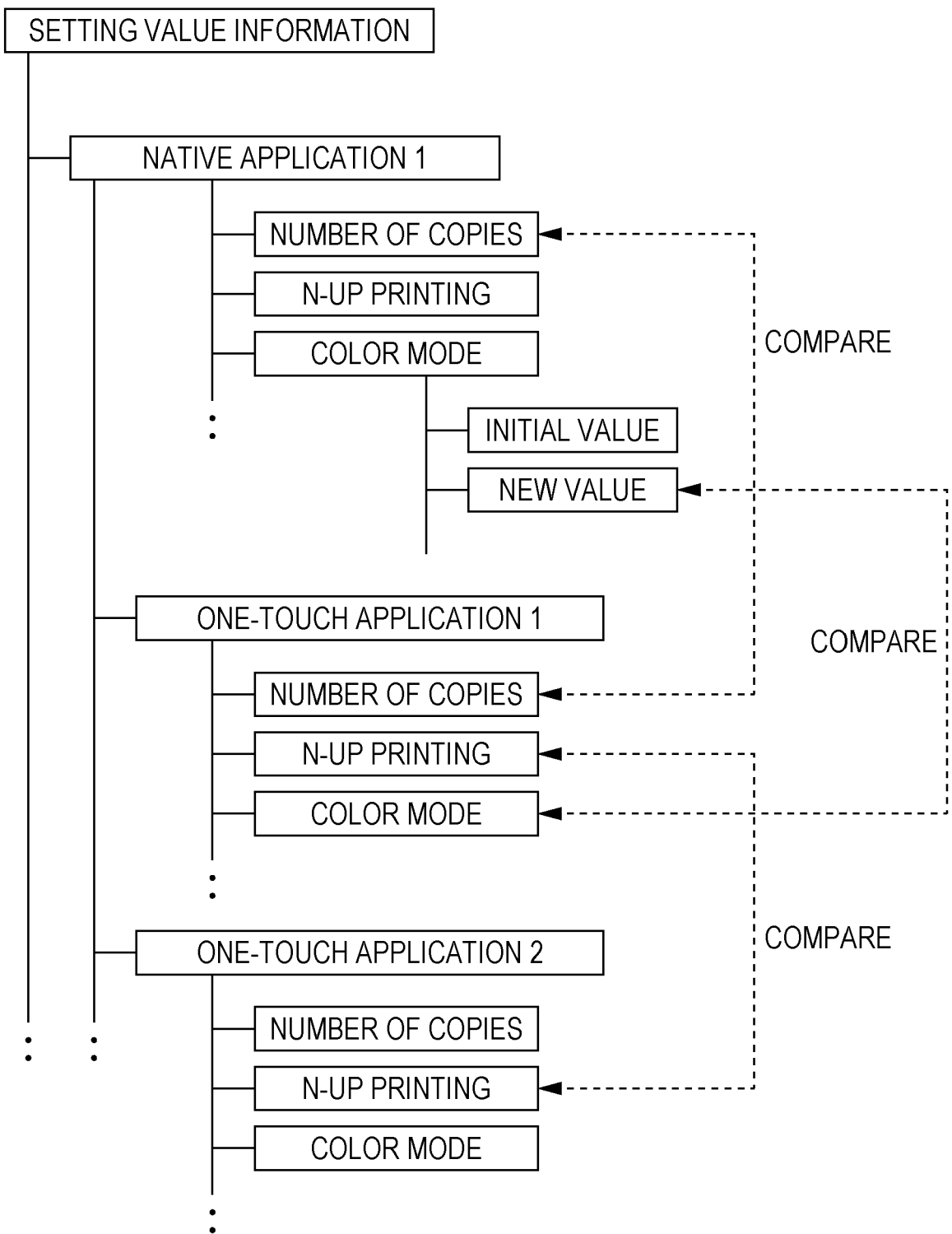
FIG. 21 is a diagram illustrating the structure of setting value information.

FIG. 21 schematically illustrates a relationship between the structure of setting value information for each application stored in the memory and a process for comparing setting values performed by the control unit 22.

The setting value information is hierarchically stored for each application and includes, for example, initial values of the number of copies, N-up printing, color mode, and the like of native application 1. If an initial value is changed, the initial value and a value after the change (new value) are stored. If there are one-touch application 1 and one-touch application 2 as one-touch applications obtained by changing setting values of native application 1, setting values of the number of copies, N-up printing, color mode, and the like of one-touch application 1 and one-touch application 2 are stored under native application 1 as the setting value information.

If native application 1 and one-touch application 1 are compared with each other, the control unit 22 compares a value of the number of copies of native application 1 and a value of the number of copies of one-touch application 1 and determines whether there is a difference in the setting value. If color mode of native application 1 has been changed from an initial value, for example, the control unit 22 compares a new value of color mode of native application 1 and a value of color mode of one-touch application 1 and determines whether there is a difference in the setting value. The new value functions a value unique to the user. In the case of a user who has logged in, the value unique to the user as the new value is to be compared.

If one-touch application 1 and one-touch application 2 are compared with each other, the control unit 22 compares a value of N-up printing of one-touch application 1 and a value of N-up printing of one-touch application 2 and determines whether there is a difference in the setting value. The same holds for other setting values.

Although an exemplary embodiment of the present invention has been described, the present invention is not limited to this, and various modifications are possible. Such modifications will be described hereinafter.

First Modification

Although a one-touch application in the above exemplary embodiment immediately (without a setting screen displayed) starts after the user touches a corresponding icon, it is needless to say that a one-touch application icon may be stored in a folder or the like and the user may display the one-touch application icon by opening the folder and start a job by touching the displayed one-touch application icon, instead. In this case, the folder may have a hierarchical structure.

Second Modification

Although a one-touch application icon in the above exemplary embodiment relates to a one-touch application and basically achieves a single function, such as copying, printing, fax, or scanning, a one-touch application icon may relate to an application having plural functions, that is, for example, an application that integrates copying and fax as a set of functions, instead. In this case, all setting values of the integrated functions are to be compared. With respect to an application that integrates plural functions, the processes described in the above exemplary embodiment may be performed and badges may be displayed while assuming that there are a one-touch application and a one-touch application icon for each function.

Third Modification

Although badges indicating setting values in which there are differences are displayed in association with a one-touch application icon in the above exemplary embodiment, a shape or a color of the one-touch application icon as an operator may be changed along with the badges. In addition, a two-copy badge or a three-copy badge may be displayed for the number of copies, and a four-up badge or a two-up badge may be displayed for N-up printing.

It is known that when a version of an application is different between a smartphone, a tablet, a computer, and the like, an icon, a name, or an extension of the application is used to indicate the difference in the version. Unlike this, in the present invention, a version of an application remains the same, and badges or the like are displayed when setting values of functions are different between applications of the same type. In FIG. 21, if there are native application 1.1 and native application 1.2, which are different versions of native application 1, these native applications are not compared with one another since the versions are different from one another. Native application 1 and native application 2 whose types of job are different from each other are also not compared with each other.

In addition, badges in the above exemplary embodiment can be defined as information (marks) whose size is smaller than that of a one-touch application icon as an operator. The size of badges, however, need not be fixed, and may change depending on the number of badges to be displayed or the priority. If the number of pieces of information to be displayed is small, each piece of information may be displayed relatively largely (insofar as smaller than a corresponding one-touch application icon), and high-priority information may be displayed relatively largely.

Fourth Modification

Although plural one-touch application icons corresponding to plural one-touch applications are arranged in the same folder 40 and grouped in the above exemplary embodiment as illustrated in FIGS. 13A to 14B, a standard application (native application) and one-touch applications may be arranged in the same folder 40 and grouped, instead. In this case, badges can be displayed by detecting differences at least between the standard application and one of the one-touch applications, two one-touch applications, or the standard application and one of the one-touch applications and two one-touch applications. Alternatively, applications located within a visible area may be grouped.

Fifth Modification

Although a multifunction machine has been described in the above exemplary embodiment, the present invention can be used for any information processing apparatus that, if an operator (icon) displayed on a display device is touched, starts an application without displaying a setting screen, such as a smartphone, a tablet, or a computer.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display that displays a first operator corresponding to a standard application and a second operator corresponding to a one-touch application of a same type that is obtained by changing a setting value of a function of the standard application and that starts if the second operator is touched; and
a controller that:
detects the setting value of the function in which there is a difference between the standard application and the one-touch application,
displays, in association with the second operator, information indicating a type of the setting value of the function in which there is the difference between the standard application and the one-touch application,
after having displayed the information in association with the second operator, receive a user operation moving the second operator into a folder in which there is another second operator with different setting values of the function of the standard application, and
after the second operator is moved into the folder, automatically change the display of the information to indicate a difference in setting values between the second operator and the another second operator in the folder.

2. The information processing apparatus according to claim 1,
wherein, when the one-touch application is one of a plurality of one-touch applications, the controller displays the information, in association with the second operator, indicating at least one of (i) the difference between the standard application and the one-touch application, and (ii) a difference between the one-touch application and a different one of the plurality of one-touch applications.

3. The information processing apparatus according to claim 1,
wherein the displayed information indicates a difference between an initial setting value of the standard application and a corresponding setting value of the one-touch application.

4. The information processing apparatus according to claim 3,
wherein, when the initial setting value of the standard application is changed to a new initial setting value, the controller automatically changes the displayed information to indicate a difference between the new initial setting value of the standard application and the corresponding setting value of the one-touch application that is not changed.

5. The information processing apparatus according to claim 1,
wherein, when a user logs in, the controller displays information indicating a difference between a setting value of the standard application unique to the user and a corresponding setting value of the one-touch application.

6. The information processing apparatus according to claim 2,
wherein, when there is a difference in a setting value between at least two of the plurality of one-touch applications, the controller displays the information, in association with the second operator, to indicate the difference in the setting value between the at least two of the plurality of one-touch applications.

7. The information processing apparatus according to claim 6,
wherein, when a new one-touch application is added, the controller displays information to indicate a difference in a setting value between at least two of the plurality of one-touch applications including the added new one-touch application.

8. The information processing apparatus according to claim 6,
wherein, when one of the plurality of one-touch applications is removed, the controller displays information to indicate a difference in a setting value between at least two of remaining one-touch applications.

9. The information processing apparatus according to claim 6,
wherein, when a user logs in, the controller displays information to indicate a difference in a setting value between at least two one-touch applications including a one-touch application unique to the user.

10. The information processing apparatus according to claim 2,
wherein, when at least two applications among the standard application and the plurality of one-touch applications are grouped, the controller displays information to indicate a difference in a setting value between at least two of the grouped applications.

11. The information processing apparatus according to claim 10,
wherein the at least two applications among the standard application and the plurality of one-touch applications are determined to be grouped when the at least two applications are arranged in a same folder.

12. The information processing apparatus according to claim 10,
wherein the at least two applications among the standard application and the plurality of one-touch applications are determined to be grouped when the at least two applications have a same name.

13. The information processing apparatus according to claim 1,
wherein the information changes a shape or a color thereof depending on the type of the setting value of the function in which there is the difference between the standard application and the one-touch application.

14. The information processing apparatus according to claim 1,
wherein, when there are a plurality of setting values in which there is a difference between the standard application and the one-touch application, the controller displays the information indicating a certain displayable number of types of the plurality of setting values in a certain order of priority.

15. The information processing apparatus according to claim 1,
wherein the standard application and the one-touch application are each an application that performs at least any of copying, printing, fax, and scanning, and
wherein the setting value is at least any of a number of copies, a number of images collected on a page, magnification, and color mode.

16. The information processing apparatus according to claim 1,
wherein the controller displays, in association with the second operator, (i) a first graphical representation representing that the one-touch application starts when the second operator is touched, and (ii) a second graphical representation that is separate and distinct from the first graphical representation, the second graphical representation being the information indicating the type of the setting value of the function in which there is the difference between the standard application and the one-touch application.

17. A non-transitory computer readable medium storing a program causing a computer to execute a process, the process comprising:
   displaying, on a display, a first operator corresponding to a standard application and a second operator corresponding to a one-touch application of a same type that is obtained by changing a setting value of a function of the standard application and that starts if the second operator is touched;
   detecting the setting value of the function in which there is a difference between the standard application and the one-touch application;
   displaying, on the display in association with the second operator, information indicating a type of the setting value of the function in which there is the difference between the standard application and the one-touch application;
   after having displayed the information in association with the second operator, receiving a user operation moving the second operator into a folder in which there is another second operator with different setting values of the function of the standard application, and
   after the second operator is moved into the folder, automatically changing the display of the information to indicate a difference in setting values between the second operator and the another second operator in the folder.

* * * * *